(12) United States Patent
Winefordner et al.

(10) Patent No.: US 10,604,207 B2
(45) Date of Patent: Mar. 31, 2020

(54) SYSTEM AND METHOD FOR ADJUSTING SPRING RATE OF A COIL SPRING IN A BIKE SUSPENSION

(71) Applicants: Carl Winefordner, Laguna Beach, CA (US); Frank Hermansen, Corona Del Mar, CA (US)

(72) Inventors: Carl Winefordner, Laguna Beach, CA (US); Frank Hermansen, Corona Del Mar, CA (US)

(*) Notice: Subject to any disclaimer, the term of this patent is extended or adjusted under 35 U.S.C. 154(b) by 227 days.

(21) Appl. No.: 15/894,805

(22) Filed: Feb. 12, 2018

(65) Prior Publication Data
US 2019/0248440 A1    Aug. 15, 2019

(51) Int. Cl.
*B62K 25/04*      (2006.01)
*F16F 1/04*       (2006.01)

(52) U.S. Cl.
CPC .............. *B62K 25/04* (2013.01); *F16F 1/041* (2013.01); *B62K 2025/048* (2013.01); *B62K 2201/04* (2013.01)

(58) Field of Classification Search
CPC .............. B62K 25/04; B62K 2025/048; B62K 2201/04; F16F 1/041; F16F 1/13; F16F 1/121; F16F 1/126; F16F 2230/0005
See application file for complete search history.

(56) References Cited

U.S. PATENT DOCUMENTS

| | | | |
|---|---|---|---|
| 2,230,340 A | 2/1941 | Shreffler | |
| 2,621,918 A * | 12/1952 | Tapp | F16F 1/13 267/287 |
| 2,673,084 A | 3/1954 | Blythe | |
| 2,703,234 A | 3/1955 | Tapp | |
| 2,801,841 A | 8/1957 | Blythe | |
| 2,807,459 A | 9/1957 | Copeland | |
| 2,832,587 A | 4/1958 | Robert | |
| 2,854,231 A | 9/1958 | Shreffler | |
| 2,904,329 A * | 9/1959 | Louis | F16F 1/13 267/33 |
| 2,924,447 A | 2/1960 | Ernest | |
| 3,028,156 A | 4/1962 | Roehrig | |
| 3,034,777 A | 5/1962 | Osterhoudt | |
| 3,091,448 A | 5/1963 | Kieffer | |
| 3,097,841 A | 7/1963 | Boyd | |
| 3,132,855 A | 5/1964 | Davis | |
| 3,141,660 A | 7/1964 | Firstbrook et al. | |

(Continued)

FOREIGN PATENT DOCUMENTS

DE  102011055867  6/2013
JP  S57113739    7/1982

OTHER PUBLICATIONS

European Patent Office, European search report for Application No. 19156661.1-1013, dated Jul. 11, 2019, 8 pages.

*Primary Examiner* — Joseph M Rocca
*Assistant Examiner* — Michael R Stabley
(74) *Attorney, Agent, or Firm* — Stetina, Brunda, Garred and Brucker

(57) ABSTRACT

A system for easily adjusting spring rate of a rear shock for mountain bikes or motorcycles without changing an actual overall spring length. The system may include a coil spring a body sized and structured to engage with the coil spring. The spring rate may be adjusted by selectively placing the body between adjacent coils of the spring to deactivate up to one spring coil adjacent the end of the spring.

23 Claims, 14 Drawing Sheets

(56) References Cited

U.S. PATENT DOCUMENTS

| | | | | |
|---|---|---|---|---|
| 3,141,661 | A | 7/1964 | Melton et al. | |
| 3,151,855 | A | 10/1964 | Joseph | |
| 3,198,508 | A | 8/1965 | Melton et al. | |
| 3,330,548 | A | 7/1967 | Starnes | |
| 3,489,403 | A | 1/1970 | Kieffer | |
| 3,591,161 | A | 7/1971 | Scheubiein, Jr. et al. | |
| 3,622,142 | A * | 11/1971 | Lorio | F16F 1/13 267/287 |
| 3,674,250 | A | 7/1972 | Joseph | |
| 3,773,309 | A | 11/1973 | Carter | |
| 3,866,896 | A * | 2/1975 | Wehner | B60G 11/14 267/287 |
| 4,093,198 | A | 6/1978 | Petersen | |
| 4,348,016 | A * | 9/1982 | Milly | B60G 17/021 267/177 |
| 4,614,333 | A | 9/1986 | Gaylord | |
| 4,832,321 | A | 5/1989 | Aardema | |
| 5,464,197 | A | 11/1995 | Ecclesfield | |
| 5,470,049 | A * | 11/1995 | Wohler | B60G 11/16 267/170 |
| 5,553,836 | A | 9/1996 | Ericson | |
| 5,722,645 | A | 3/1998 | Reitter | |
| 6,095,541 | A | 8/2000 | Turner et al. | |
| 6,186,488 | B1 | 2/2001 | Lauer | |
| 6,206,397 | B1 * | 3/2001 | Klassen | B62K 25/286 280/284 |
| 6,273,407 | B1 * | 8/2001 | Germano | B60G 13/005 267/172 |
| 6,283,462 | B1 | 9/2001 | Emmert | |
| 6,471,197 | B1 | 10/2002 | Denk et al. | |
| 6,619,638 | B1 | 9/2003 | Spencer | |
| 7,527,252 | B2 | 5/2009 | Oohashi | |
| 7,891,645 | B2 | 2/2011 | Schroeder | |
| 7,938,424 | B2 * | 5/2011 | Arraiz | B62K 25/286 280/284 |
| 8,322,695 | B2 | 12/2012 | Sugar et al. | |
| 8,398,060 | B2 | 3/2013 | Stanforth et al. | |
| 9,186,950 | B2 | 11/2015 | Wootten et al. | |
| 9,744,826 | B2 | 8/2017 | Cox | |
| 2004/0183243 | A1 | 9/2004 | Chen et al. | |
| 2005/0218572 | A1 | 10/2005 | Soga et al. | |
| 2010/0230878 | A1 | 9/2010 | Seidl | |
| 2012/0187653 | A1 * | 7/2012 | Edgeworth | B62K 25/28 280/283 |
| 2012/0286462 | A1 | 11/2012 | Pepka | |
| 2013/0175394 | A1 | 7/2013 | Cipra | |

\* cited by examiner

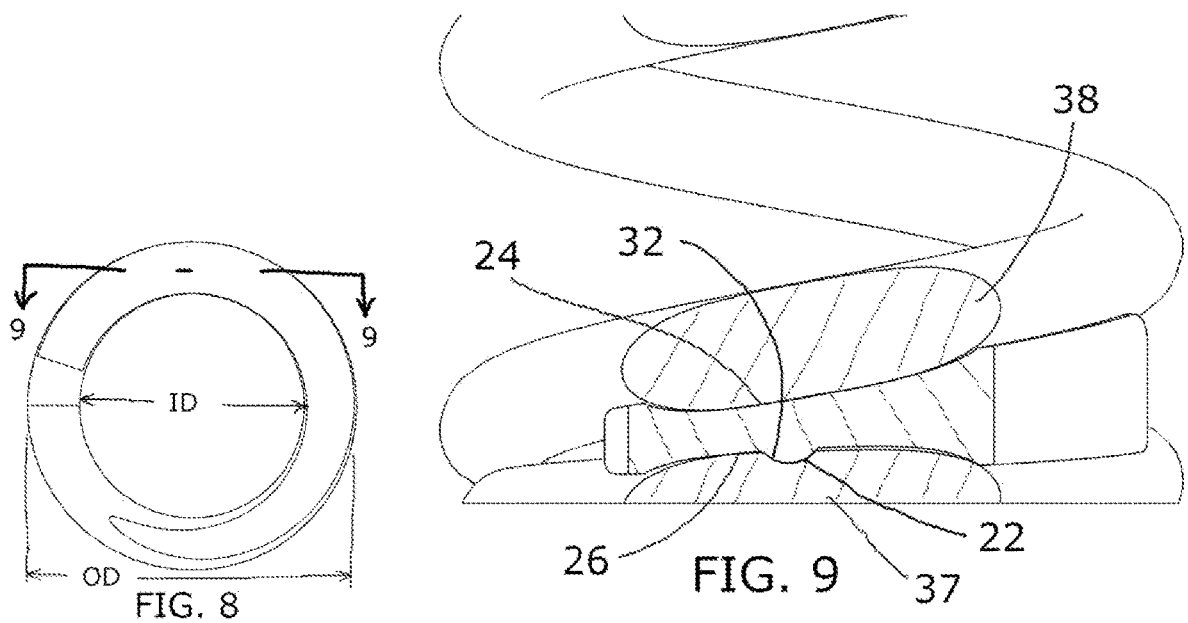
FIG. 8
FIG. 9
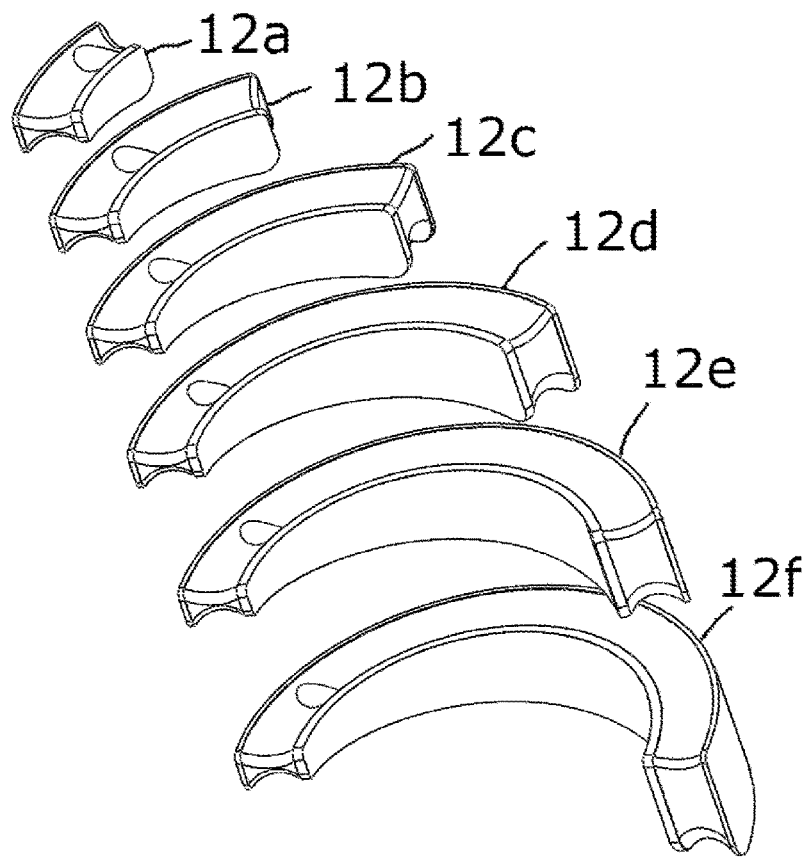
FIG. 10

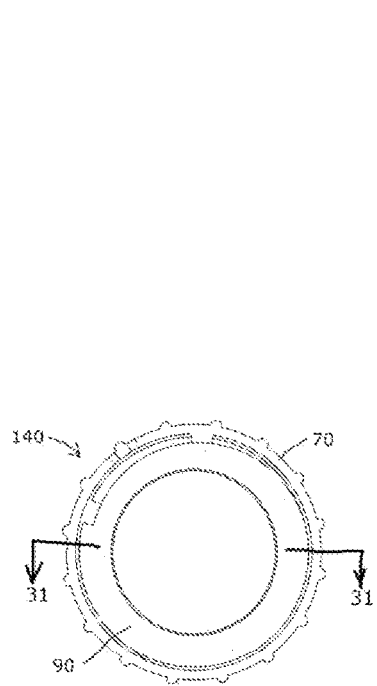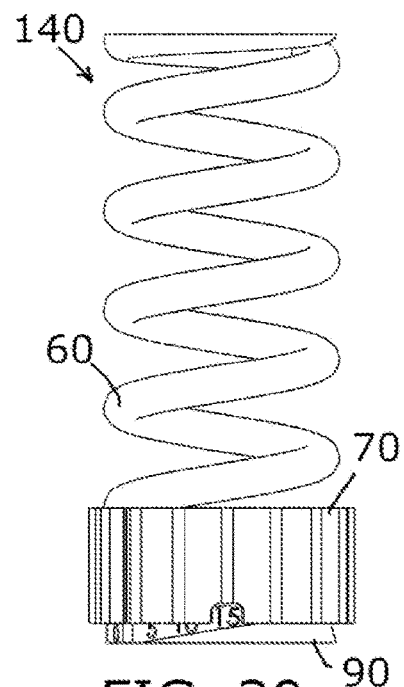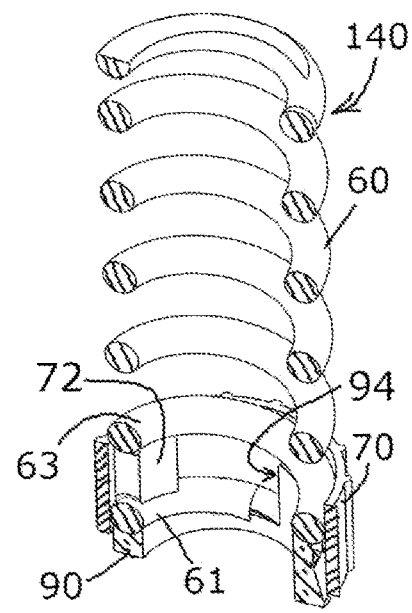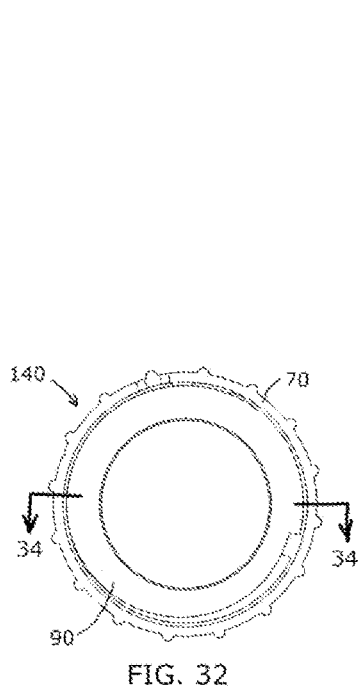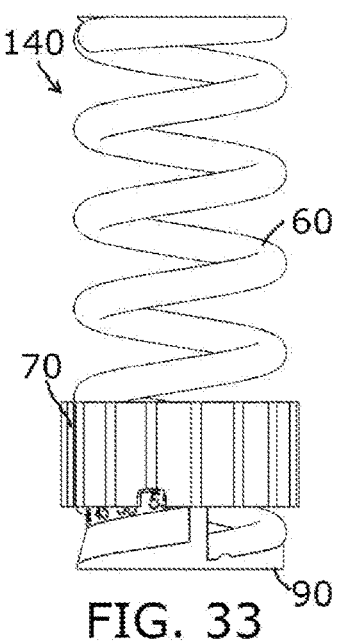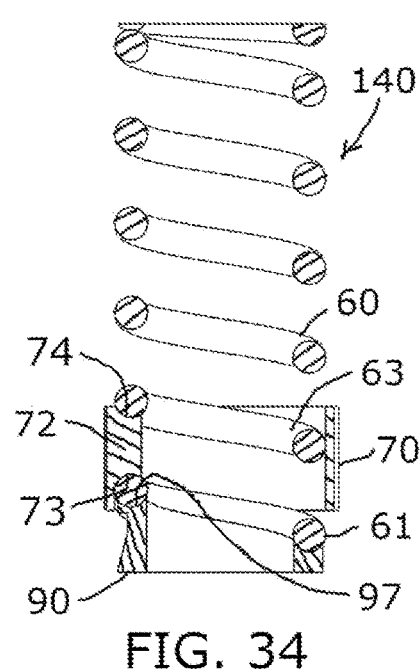

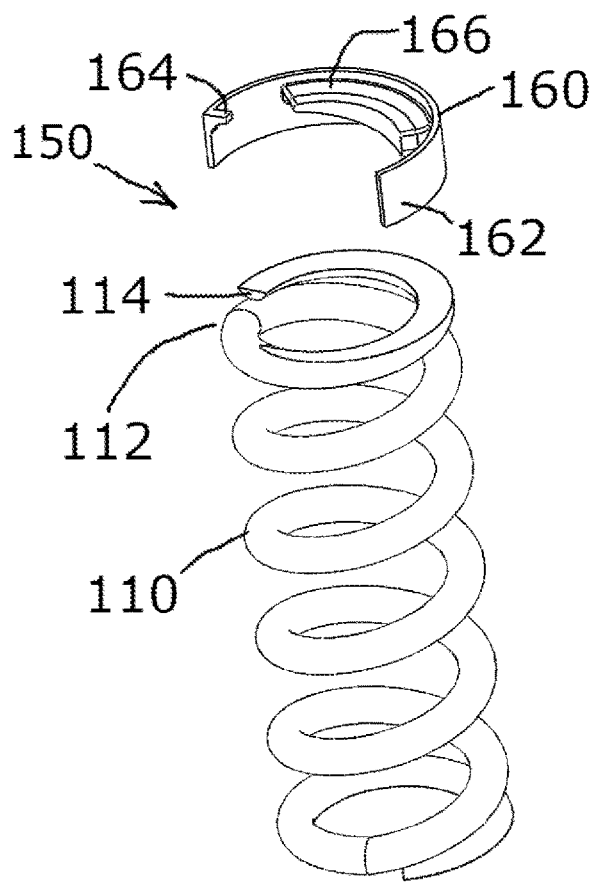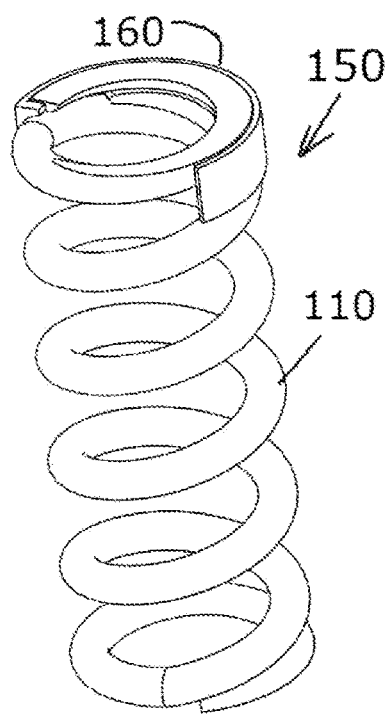
FIG. 35   FIG. 36
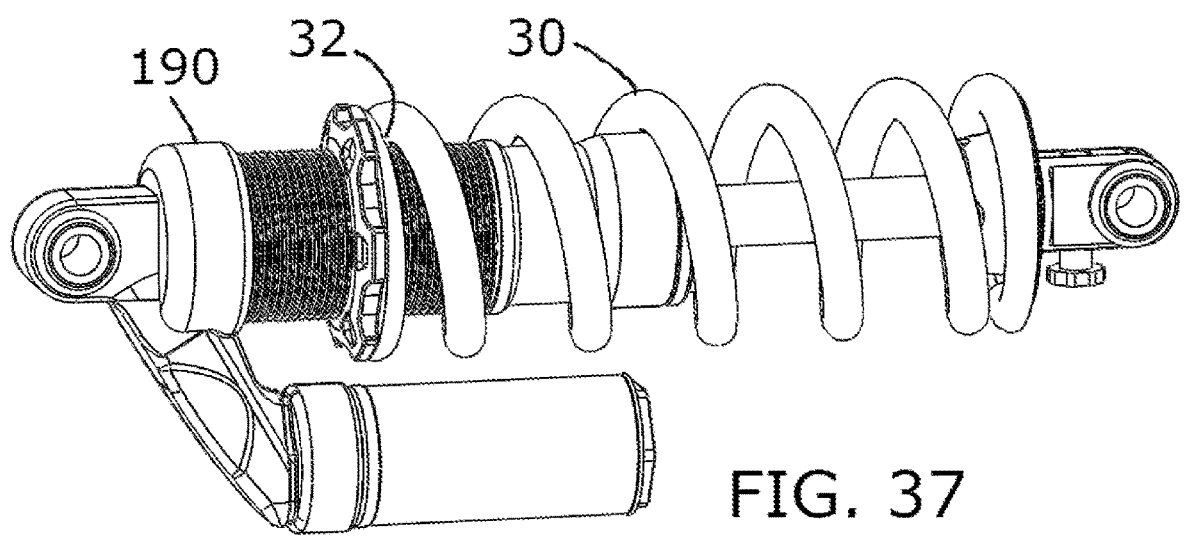
FIG. 37

SYSTEM AND METHOD FOR ADJUSTING SPRING RATE OF A COIL SPRING IN A BIKE SUSPENSION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to coil springs in rear suspension shocks of mountain bikes and motorcycles, and more specifically to an adjustment system that allows users to easily and inexpensively optimize the spring rate of the coil spring without replacing the spring.

2. Description of the Related Art

Full suspension mountain bikes may use either an air shock or a coil shock to suspend one or both wheels. An air shock may generate a spring force by air pressure within a chamber, whereas a coil shock may generate a spring force by a coil spring. An advantage of an air shock may be that the force can be tuned to rider preference simply by adding or removing air from within the chamber, while a disadvantage may be excessive static friction ("stiction") caused by seals that prevents the air shock from reacting to small bumps in the terrain. An advantage of a coil shock may be that because the coil shock does not have stiction, a coil shock may react to very small bumps, and thus, has better performance and ride quality than does an air shock. A disadvantage of a coil shock may be that the spring rate may be fixed and the only means of adjustment to spring force is a small amount of pre-load change, typically created by compressing the coil spring with a threaded ring or spacer. However, adjusting the preload to a coil shock may not be the same as adjusting the spring rate.

Typically, when a rider buys a full suspension mountain bike, the bike may include a coil shock that has a spring of a certain spring rate. Usually, coil springs for coil shocks may be available with spring rate increments of 50 lb/in, such as 350 lb/in, 400 lb/in, 450 lb/in, 500 lb/in, and 550 lb/in. The correct/preferred spring rate for a particular rider may depend on the geometry of the bicycle suspension, the weight of the rider, and the riding style of the rider. Generally, bicycle companies choose to assemble their bikes with lower spring rate coils for smaller sized bikes and higher spring rate coils for larger bike sizes, making the assumption that heavier people ride bigger bikes. While this may be true to some degree, oftentimes shorter people may be heavier than taller people, and the size of the rider may be unrelated to their riding style. Moreover, different riding styles that may affect coil spring requirements may include, for example, whether or not the rider aggressively jumps their bike into the air and lands hard on the ground compared to mostly riding on smooth terrain. Big jumps may require a much stiffer coil spring so as to not bottom out their suspension. Therefore, most people that buy a full suspension mountain bike including a coil shock may have the wrong spring rate associated therewith. If the spring rate is too low, the suspension may bottom out too soon and possibly cause a crash or break the bicycle frame or other components. Conversely, if the spring rate is too high, the rider may only access a portion of the full possible suspension travel, providing an inferior ride quality.

When a rider buys an aftermarket rear shock for their mountain bike, they typically buy the shock separately from the spring. However, the rider may only guess which spring they should buy unless the rider is buying exactly the same shock that they have been using previously on a specific bike. However, in many cases, coil shocks and spring may be bought to upgrade from an air shock, in which case they rider may have too little information to know which strength spring to order.

Typically, suspensions are most effective when, at rest, the vehicle plus passenger(s) cause about 20 to 30% sag in the suspension spring(s). Sag may refer to the percentage of travel being used by the suspended system when sitting still. This is so that the suspension may react not only to bumps but also to depressions in terrain. For example, if a suspended wheel has 8 inches of possible travel, the suspension spring force may be such that at rest, the vehicle was sitting about 2 inches into the travel. In that way, the wheel could travel up from rest about 6 inches, and travel down from rest about 2 inches. This may be how small vibrations are smoothed out as the wheel travels up and down within its suspended travel. Coil shocks usually include a threaded ring for preloading the coil. However, preloading may not be the same as using a stiffer spring. Preloading a spring that is too soft might correct the sag amount, but may not compensate for proper travel. For example, if a 400 lb/in spring was too soft for a particular rider, which may lead the rider to preload the spring 10%, that would likely result in 40 pounds of force at rest. That would mean that at 2 inches of full shock travel, the total load may be approximately 840 pounds (2×400+40). However, a 450 lb/in spring with no preload may have approximately 900 pounds (2×450) of force at 2 inches of shock travel, and the forces at every point between 0 inches and 2 inches would likely be entirely different. Furthermore, most shocks may only be capable of preloading a maximum of about 5%. Mountain bike shocks may be designed for as little preload as is necessary to take play out of the system. In the first example, the rider using the preloaded 400 lb/in spring might bottom out their suspension on big hits and there may be no way to compensate by using more preload without causing other problems such as too little sag. Heavy preload may also cause constant spring load even when the rider is not using the bike, which may prematurely reduce coil life.

In addition to the foregoing problems, it may be difficult for the rider having a full suspension mountain bike with the wrong coil spring to buy the correct spring on the first try. For example, if the rider has a 500 lb/in coil spring on their bike and the rider realizes that the 500 lb/in coil spring is too stiff, there may be a question as to the magnitude by which the spring is too stiff, e.g., should the replacement spring be a 350 lb/in coil spring, a 400 lb/in coil spring, or a 450 lb/in coil spring? If the rider buy a 450 lb/in coil spring, the rider might find that the coil spring is still too stiff, and now the rider may need to buy yet another coil spring. Or, if the rider started with a 500 lb/in coil spring that felt too stiff and replaced it with a 400 lb/in coil spring that felt a little soft, should the rider then buy a 450 lb/in coil spring when it might be too stiff? While manufacturers give guidelines for spring rate, there may be so many variables that influence spring rate, that the estimations are rough. Such variables may include rider preference, body weight, rider weight distribution (front/rear bias), setup of bike such as stem length and fore/aft saddle position, type of terrain, and riding aggressiveness.

Furthermore, there may be a big difference between springs that have a 50 lb/in spring rate differential. Along these lines, the rider's ideal spring rate may fall between two 50 lb/in increments. Along these lines, even an increment much smaller than 50 lb/in, such as 10 lb/in, may make a noticeable difference. However, it may be impractical for a company to offer extremely fine spring rate increments, partly because it would likely be expensive and time consuming for a rider to determine their ideal spring rate. Thus, springs that may be available in 50 lb/in increments may result in a rider not finding the optimal suspension.

Another problem commonly associated with finding an ideal spring rate may include manufacturing tolerances of coil springs. A spring that may be intended to be 400 lb/in might actually be 390 or 410 lb/in. Furthermore, a spring from one manufacturer could be noticeably different than a supposedly similar spring from another manufacturer. A rider that likes a steel spring that is supposedly 400 lb/in could be severely disappointed if they ordered a lightweight titanium replacement spring that is supposedly 400 lb/in. The two springs could be 20 lb/in different from each other because of manufacturing tolerances.

Accordingly, there is a need in the art for an adjustment system which allows for selective adjustment of a spring rate for a coil spring for a mountain bike or motorcycle. Various aspects of the present disclosure address this particular need, as will be discussed in more detail below.

BRIEF SUMMARY

In accordance with one embodiment of the present disclosure, there is provided an adjustment system for use with a damper of a bike suspension. The adjustment system may comprise a coil spring engageable with the damper and extending about a spring axis. The coil spring includes an end coil and an adjacent coil extending helically away from the end coil to define a gap between the end coil and the adjacent coil in a direction parallel to the spring axis. The coil spring further includes a first engagement element formed on at least one of the end coil and the adjacent coil. The adjustment system may additionally include an insert having a second engagement element engageable with the first engagement element. The insert occupies a portion of the gap and contacts the end coil and the adjacent coil to mitigate compression of the adjacent coil toward the end coil when the second engagement element is engaged with the first engagement element.

The first engagement element may include a groove formed on the at least one of the end coil and the adjacent coil. The second engagement element may include a protrusion complimentary to the groove.

The size of the gap formed in the coil spring may increase as the adjacent coil extend portions away from the end coil.

The insert may include a first surface and a second surface, with the first surface contacting the end coil and the second surface contacting the adjacent coil when the first engagement element is engaged with the second engagement element. The insert may include a first end portion and a second end portion, with both the first surface and the second surface extending between the first and second end portions. A distance between the first and second surfaces may vary between the first end portion and the second end portion.

The insert may be a first insert, and the adjustment system may further comprise a second insert larger than the first insert. The first insert and the second insert may be interchangeably engageable with the coil spring. The second insert may be sized to occupy a larger portion of the gap than the first insert when the second insert is engaged with the coil spring.

The insert may be a first insert, and the adjustment system may further comprise a second insert engageable with the first insert. The first insert and second insert may be engageable with the coil spring when the first insert is engaged with the second insert. The first insert may include a tongue and the second insert may include a groove sized to receive the tongue of the first insert to facilitate engagement between the first insert and the second insert.

The coil spring may include a second engagement element engageable with a second insert.

According to another embodiment, the adjustment system includes a coil spring engageable with a damper. The coil spring includes a helical body including a plurality of coils, with the coil spring being associated with a base spring rate. The adjustment system may additionally include a collar rotatable relative to the coil spring. The collar includes a peripheral wall and a body extending from the peripheral wall. The body may contact an adjacent pair of the plurality of coils to mitigate compression of the adjacent pair of the plurality of coils to define an effective spring rate equal to or greater than the base spring rate, the body being moveable along the helical body as the collar is rotated relative to the coil spring, the effective spring rate being adjustable by movement of the body relative to the plurality of coils.

The coil spring may include a first end portion, and the adjustment system may additionally include a base engageable with the first end portion of the coil spring. The collar may be rotatable relative to the base and transitional between a first position and a second position. The collar may have an abutment portion contacting the base when the collar is in the first position, with the abutment portion of the collar moving out of contact with the base as the collar is transitioned from the first position toward the second position. The base may include an indicator displaying effective spring rate information based on a relative rotational position of the collar relative to the base. The effective spring rate of the coil spring may increase as the collar is rotated from the first position toward the second position. The effective spring rate may be equal to the base spring rate when the collar is in the first position. The base may include a first surface and a second surface spaced from the first surface. The second surface may be complimentary in shape to a portion of the helical body so as to extend portion along the portion of the helical body when the base is engaged with the coil spring.

The peripheral wall may completely circumnavigate the coil spring when the collar is engaged with the coil spring.

According to another embodiment, there is provided an insert for use with a damper of a bike suspension and a coil spring engageable with the damper and extending about a spring axis. The coil spring may include an end coil and an adjacent coil extending away from the end coil to define a gap therebetween. The insert may include a first surface positionable in contact with the end coil, and a second surface positionable in contact with the adjacent coil. The insert may further include a second engagement element engageable with the first engagement element. The insert may be sized and structured to occupy a portion of the gap and mitigate compression of the adjacent coil toward the end coil when the second engagement element is engaged with the first engagement element.

According to another embodiment, there is provided an adjustment system for use with a damper of a bike suspension. The adjustment system includes a coil spring engageable with the damper, with the coil spring having helical body including a plurality of coils, and being associated with a base spring rate. The adjustment system further includes a wedge insert engageable with the coil spring, and a body engageable with the coil spring and moveable relative to the coil spring and the wedge insert. The body contacts adjacent coils on the coil spring to mitigate compression of the coils to generate an effective spring rate of the coil spring greater than the base spring rate. The body is moveable relative to the coil spring between a first position and a second position, with the effective spring rate increasing as the body moves from the first position toward the second position.

The wedge insert may extend between a first pair of coils on the coil spring to mitigate compression between the first pair of coils, and the body may extend between a second pair of coils on the coil spring to mitigate compression between the second pair of coils.

The body may move helically away for the first pair of coils as the body transitions from the first position toward the second position.

The body and the wedge insert may include complimentary engagement elements to facilitate selective incremental adjustment of the body relative to the wedge insert. The complimentary engagement elements may include a plurality of grooves on one of the body and the wedge insert, and a tab on the other one of the body and the wedge insert. The tab may be on the body. The body may include a wall, and the tab may be moveable relative to the wall between a first position associated with the tab residing within one of the plurality of grooves, and a second position associated with the tab being removed from the plurality of grooves.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 8 is a bottom view of the first embodiment of the adjustment system;

FIG. 9 is a section view of the first embodiment of the adjustment system with the wedge insert engaged with the coil spring;

FIG. 10 is an upper perspective view of several wedge inserts in a variety of sizes;

FIG. 29 is a bottom view of the second embodiment of the adjustment system adjusted to a 15 lb/in stronger effective spring rate setting relative to that shown in FIG. 26;

FIG. 30 is a side view of the second embodiment of the adjustment system adjusted to a 15 lb/in stronger effective spring rate setting relative to that shown in FIG. 27;

FIG. 31 is an upper perspective, section view of the second embodiment of the adjustment system adjusted to a 15 lb/in stronger effective spring rate setting relative to that shown in FIG. 28;

FIG. 32 is a bottom view of the second embodiment of the adjustment system adjusted to a 55 lb/in stronger effective spring rate setting relative to that shown in FIG. 26;

FIG. 33 is a side view of the second embodiment of the adjustment system adjusted to a 55 lb/in stronger effective spring rate setting relative to that shown in FIG. 27;

FIG. 34 is a section view of the second embodiment of the adjustment system adjusted to a 55 lb/in stronger effective spring rate setting relative to that shown in FIG. 28;

FIG. 35 is an exploded, upper perspective view of a third embodiment of the adjustment system including a coil spring and a wedge insert;

FIG. 36 is an upper perspective view of the third embodiment of the adjustment system with the wedge insert engaged with the coil spring to increase the effective spring rate of the coil spring;

FIG. 37 is an upper perspective view of a shock with the coil spring installed and in the lowest spring rate condition;

Common reference numerals are used throughout the drawings and the detailed description to indicate the same elements.

DETAILED DESCRIPTION

The detailed description set forth below in connection with the append portioned drawings is intend portioned as a description of certain embodiments of an adjustment system for a coil spring and is not intend portioned to represent the only forms that may be developed or utilized. The description sets forth the various structure and/or functions in connection with the illustrated embodiments, but it is to be understood, however, that the same or equivalent structure and/or functions may be accomplished by different embodiments that are also intend portioned to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to adjustment of shock for a bike by selectively placing a body between two adjacent coils in a coil spring of the shock. The body is rigid enough to mitigate compression of the adjacent coils toward each other, thereby resulting in an increase in the effective spring rate of the spring. The position of the body can effectively shorten or lengthen the spring, to allow for variance in the effective spring rate, without adjusting the actual length of the spring. Therefore, by selectively placing the body relative to the coil spring, a user may quickly and easily adjust the effective spring rate.

Figure 1:
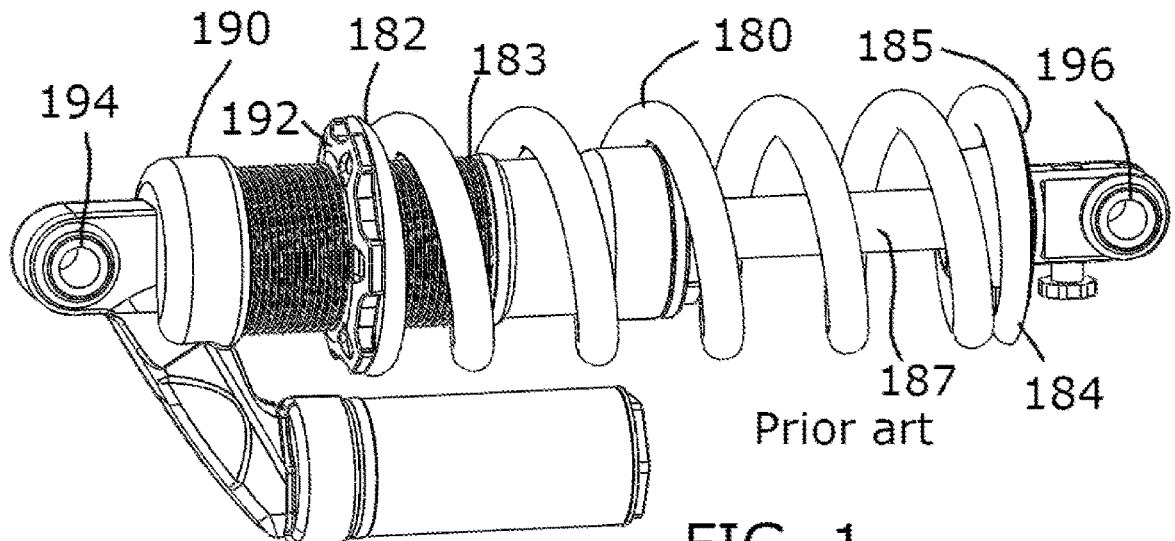
FIG. 1 is an upper perspective view of a prior art shock used for mountain bikes and motorcycles.

Referring now to the drawings, wherein the showings are for purposes of illustrating preferred embodiments of the present disclosure, and are not for purposes of limiting the same, FIG. 1 shows a prior art shock, which may be used on a bike. As used herein, the term "bike" is intended to broadly encompass both mountain bikes and motorcycles. The shock generally includes a coil spring 180 and a damper 190, with a portion of the damper 190 extending through the coil spring 180. The coil spring 180 is captured between a preload ring 192, which is externally threaded to an upper body 183 of the damper 190, and a flange 185 located at the end portion of a damper rod 187, which may reciprocate relative to the upper body 183 to absorb shock. Typically, the shock includes opposed mounts 194, 196 for mounting the shock to the vehicle (e.g., the mountain bike, motorcycle, etc.). Mount 194 may be attached to the bike or motorcycle frame, and mount 196 may be attached to the suspend portioned swing arm or other suspension linkage component of the mountain bike or motorcycle. While the rider is sitting on the mountain bike or motorcycle, preload ring 192 is used to adjust for small differences in spring 180 overall length and to adjust preload in order to optimize the suspension sag. For instance, twisting the preload ring 192 relative to the body 183 in a first rotational direction, causing the preload ring 192 to move toward flange 185, shortens the length of the spring 180, thereby creating more preload. Conversely, twisting the preload ring 192 relative to the body 183 in an opposing second rotational direction, causes the preload ring 192 to move away from flange 185 to lengthen the length of the spring 180, thereby decreasing the preload.

Figure 2:
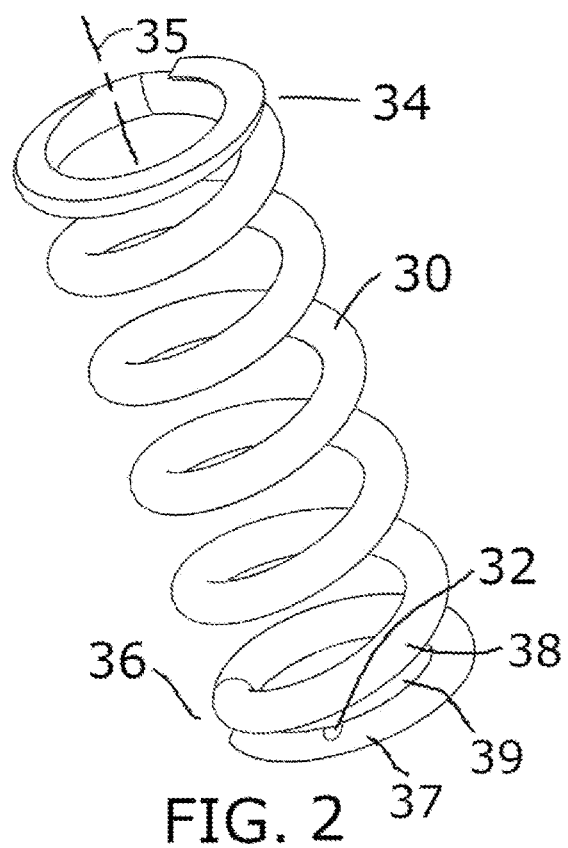
FIG. 2 is an upper perspective view of a coil spring with a pair of closed and ground end portions.
Figure 3:
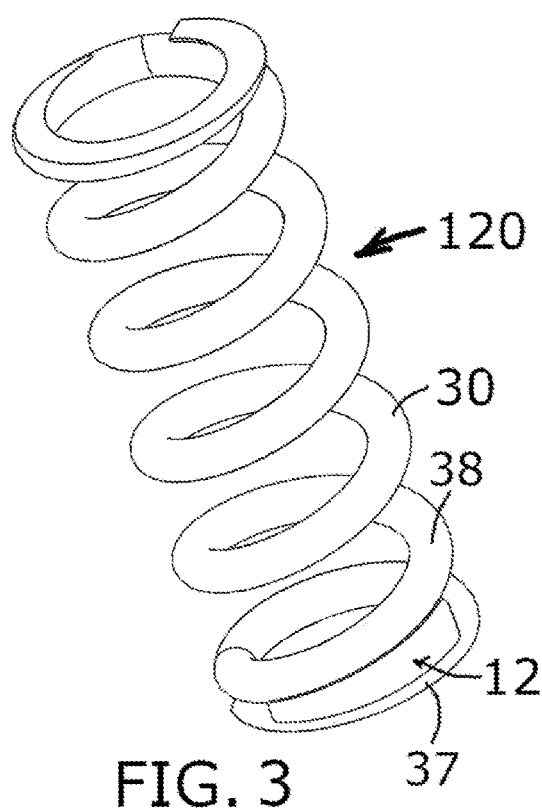
FIG. 3 is an upper perspective view of a first embodiment of an adjustment system including the coil spring of FIG. 2 with a wedge insert engaged therewith for adjusting an effective spring rate of the coil spring.
Figure 4:
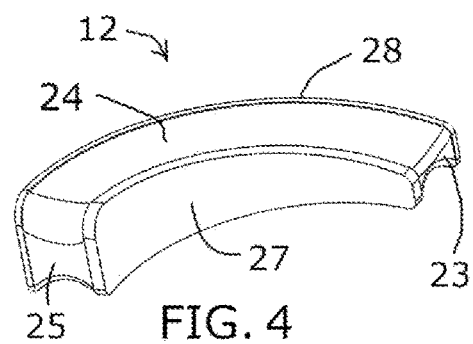
FIG. 4 is an upper perspective top view of the wedge insert of FIG. 3.

Referring now to FIGS. 2 and 3, a first embodiment of an adjustment system 120 is depicted and generally comprises a coil spring 30 and a wedge insert 12. The coil spring 30 may be engageable with a damper and may extend portion about a spring axis 35. Coil spring 30 may be a typical coil spring used on mountain bike suspensions, with the primary distinction being that spring 30 includes a groove 32 (e.g., a first engagement element), the importance of which will be described in more detail below.

Coil spring 30 includes a body having a pair of closed and ground end portions 34, 36 and a number of coils disposed therebetween. Furthermore, the body of the coil spring 30 may be of a thickness so as to define an outer diameter, "OD" (see FIG. 8), and an inner diameter "ID." Each coil of the coil spring 30 may be defined by 360 degrees of rotation of the coil spring 30. For instance, the exemplary embodiment depicted in FIG. 2 includes 6.5 coils, although it is understood that the scope of the present disclosure is not limited thereto. In a given coil spring 30, the end portion-most coils 37 may be referred to as the "end coils" and the coils 38 immediately adjacent the end coils 37 may be referred to as "adjacent coils." The end coils 37 shown in FIG. 2 include a generally planar end portion surfaces, residing in respective end portion planes. The adjacent coils 38 extend portion helically away from the respective end coils 37 to define a gap 39 between a given end coil 37 and the corresponding adjacent coil 38. The coil spring 30 is associated with a base spring rate, which may be a function of coil count, spring diameter, wire diameter and material.

The groove 32 is shown as being formed on a portion of the end coil 37 which faces the adjacent coil 38, with the groove 32 extending in a radial direction relative to the spring axis 35. In this regard, the groove 32 may extend portion generally perpendicularly relative to the spring axis 35. While the exemplary embodiment of the coil spring 30 includes the groove 32 on the end coil 37, it is contemplated that in other embodiments, the groove 32 may be formed on a portion of the adjacent coil 38 facing the end coil 37. In this regard, the groove 32 may be located on any portion of the coil spring 30 which may interface with the wedge insert 12.

FIG. 3 shows wedge insert 12 installed in spring 30 for purposes of increasing an effective spring rate of the coil spring 30 by mitigating compression of the adjacent coil 38 toward end coil 37. Mitigating compression of the adjacent coil toward the end coil 37 has the effect of deactivating a portion of the adjacent coil 38. The "effective spring rate" is larger than the base spring rate, and refers to the operational spring rate of the coil spring 30 when the wedge insert 12 is engaged therewith. The effective spring rate may be correlated to the size of the wedge insert 12, with larger wedge inserts 12 being associated with an effective spring rate that is higher in magnitude than the effective spring rate associated with smaller wedge inserts 12. However, both smaller and larger wedge inserts 12, when engaged with the coil spring 30, produce an effective spring rate that is greater than the base spring rate.

Wedge insert 12 may be made of a fiber reinforced polymer such as 30% glass filled nylon in order to be both light, inexpensive, and strong enough to be disposable in compression when engaged with the spring 30. In the example shown, wedge 12 would weigh less than 3 grams, which is negligible compared to spring 30 that may weigh around 500 grams. Alternatively, wedge 12 could be successfully made of many different suitable materials including metals, carbon fiber, thermoplastics, thermosets, firm elastomers, or other materials known to those skilled in the art. Spring 30 can be made of steel, titanium, or other suitable material.

Referring now specifically to FIGS. 4-9, one embodiment of wedge insert 12 includes a top surface 24, a bottom surface 26, and a protrusion 22 (e.g., a second engagement element) extending from the bottom surface 26. Top and bottom surfaces 24 and 26 may have helical curves which fit the closed end portion 36 of spring 30. In this regard, the wedge insert 12 may be complimentary in shape to the gap 39, with the top surface 24 being complimentary to the shape and size of the adjacent coil 38 and the bottom surface 26 being complimentary in shape to the end coil 37. Along these lines, if the coil spring 30 is formed of a wire having a circular cross section, the top and bottom surfaces 24, 26 of the wedge insert 12 may be concave to accommodate the rounded configuration of the coils. The wedge insert 12 may additionally include an inner wall 27 and an outer wall 28 separated from each other by the top and bottom surfaces 24, 26. Both the inner wall 27 and the outer wall 28 may be arcuate in configuration, with an internal surface of the inner wall 27 being concave, and an external surface of the outer wall 28 being convex. The wedge insert 12 may further be configured to define a narrow end portion 23 and a wide end portion 25 and a length as the arcuate distance between the narrow end portion 23 and the wide end portion 25 along a midline of the wedge insert 12 (i.e., between the inner wall 27 and outer wall 28).

When installed, the protrusion 22 formed on the wedge insert 12 is advanced into groove 32, thereby engaging with groove 32 formed on the spring 30 and allowing the wedge insert 12 to assume a locked position relative to the coil spring 30. When the wedge insert 12 is in the locked position, the bottom surface 26 of the wedge insert 12 contacts a portion of the end coil 37, and the top surface 24 of the wedge insert 12 contacts a portion of the adjacent coil 38. Being that spring 30 is a coil spring, the compressive nature of the spring 30 mitigates inadvertent dislodging of the wedge insert 12 without either intentionally sliding wedge insert 12 out of its locked position or intentionally spreading apart the closed end portion 36 with a tool such as a flat blade screw driver.

Figure 5:
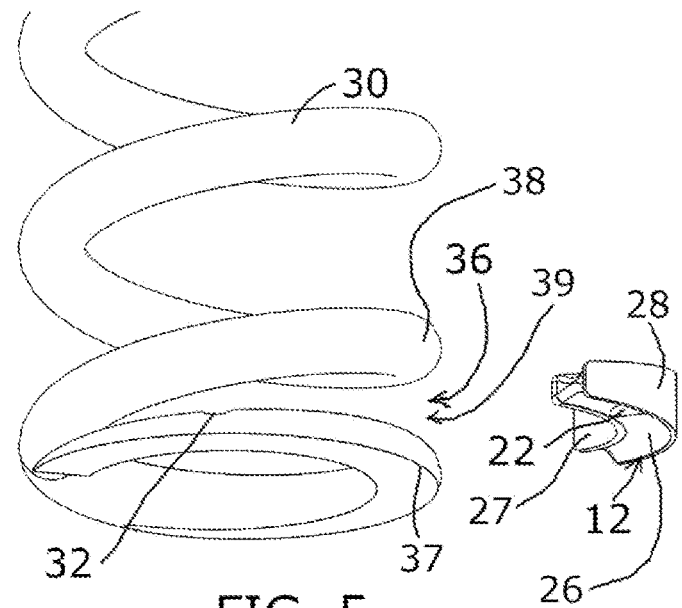
FIGS. 5-7 are enlarged, lower perspective views depicting installation of the wedge insert into the coil spring.
Figure 6:
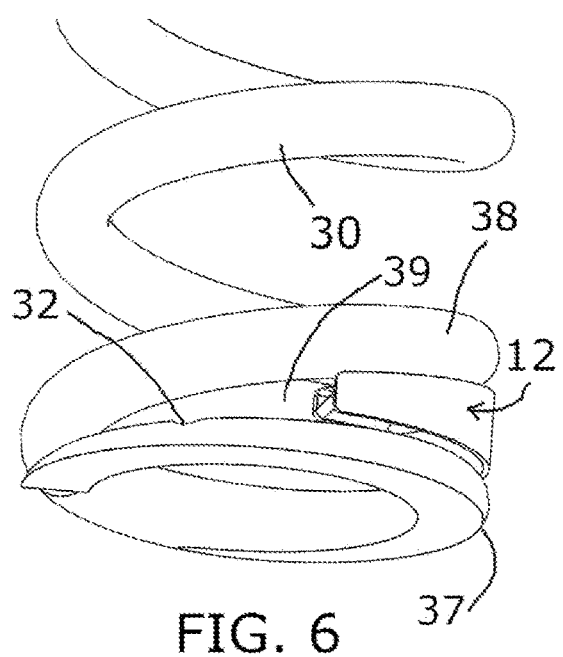
Figure 7:
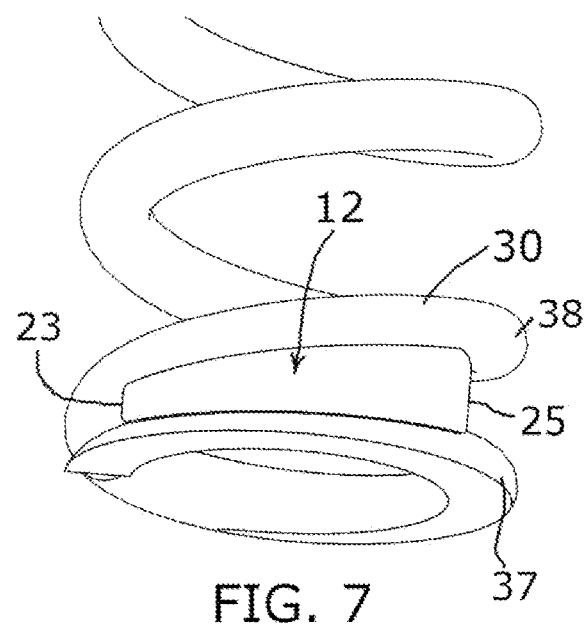

FIGS. 5-9 show the ease of installing the wedge insert 12 into spring 30. In FIG. 5, the wedge insert 12 is positioned adjacent the gap 39, with the inner wall 27 of the wedge insert 12 facing the spring 30. In FIG. 6, the wedge insert 12 is moved into the gap 39, between the end coil 37 and the adjacent coil 38. In FIG. 7, the narrow end portion 23 of the wedge insert 12 is moved toward a narrow end portion of the gap 39, until the protrusion 22 is located in the groove 32 formed on the spring 30. The movement of the wedge insert 12 within the gap 39 to engage the protrusion 22 with the groove 32 may be rotational movement of the wedge insert 12 relative to the spring 30.

Figure 10A:
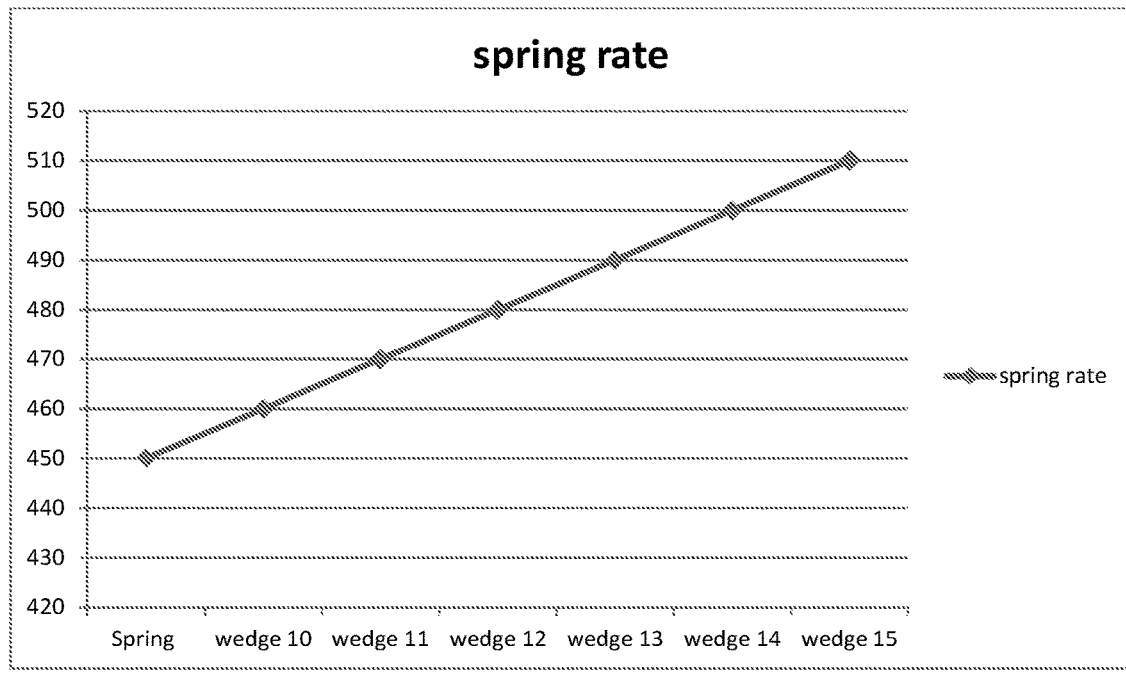
FIG. 10A is a graph showing the effective spring rate associated with the various wedge inserts.

FIG. 10 shows a variety of wedge inserts 12a, 12b, 12c, 12d, 12e, 12f, which are of varying lengths to deactivate increasingly larger amounts of an active coil. Along these lines, the narrow end portions of each wedge insert may be similarly sized, however, the wide end portions may have differing heights, with each progressively larger insert having a progressively larger height at its wide end portion so as to occupy a larger amount of the gap 39. For a 450 lb/in spring, theory and actual test results show that wedge 12a may add about 10 lb/in, wedge 12b may add about 20 lb/in, etc. Wedges 12a-f would likely cost a small fraction of spring 30, yet would effectively provide the user with the ability to fine tune a spring rate that works best for them without buying more springs. Also, it is much easier to remove and install a wedge insert 12 than to remove and install an entirely new spring for purposes of varying the spring rate. Wedges 12a-f may correct for spring manufacturing strength tolerances, increase the likelihood that the user has the right spring, and makes it easier to choose the right spring if the original spring is too stiff. If the user wanted to order a custom titanium spring, for example, they could first fine tune their original spring with wedges in order to learn the exact spring rate that is best for them. FIG. 10A is a graph showing the effective spring rate associated with the various wedge inserts 12a-f used in adjustment system 120. It is understood that the effective spring rate increase increments of 10 pounds/inch are only an example, and that wedge inserts of other sizes could be made to decrease or increase the spring rate increments or range of increase.

Figure 11:
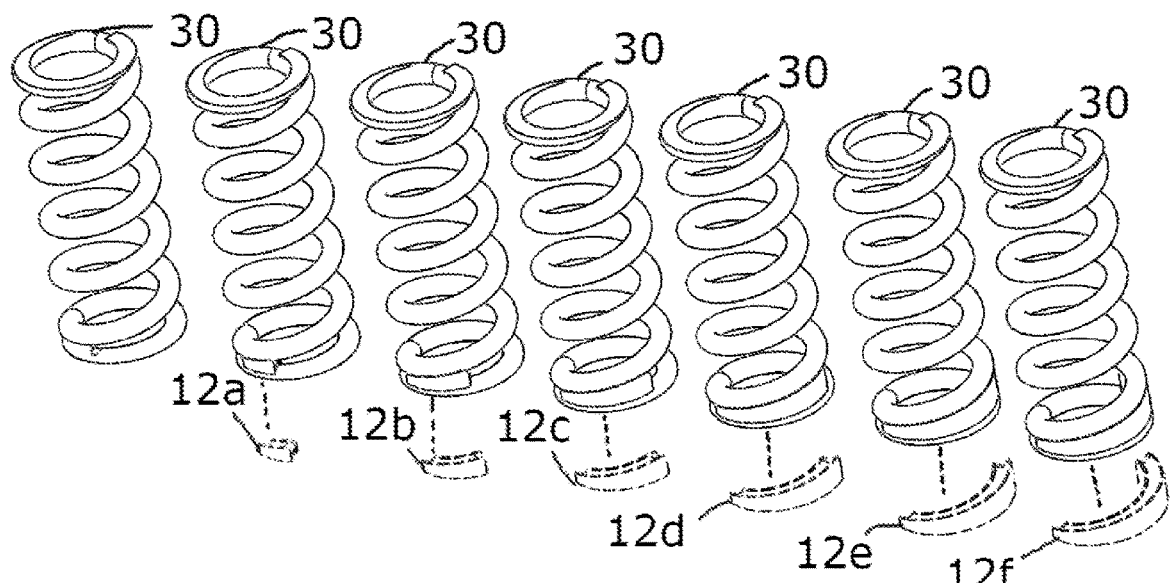
FIG. 11 is an upper perspective view the various wedge inserts engaged with the coil spring for adjusting the adjustment system from weaker to stronger spring effective rates.

Referring now to FIG. 11, there is shown seven springs 30. The far left spring 30 is without a wedge insert installed. The other springs 30 have, in order from left to right, wedges 12a, 12b, 12c, 12d, 12e, and 12f installed. See the table in FIG. 10A for the spring rate differences. Note that increasing the spring rate in this way may add stress to the spring 30, so it is important to design the spring 30 such that even with the largest wedge 12*f* added, the stress will be within the limits for the use intend portioned.

Figure 12:
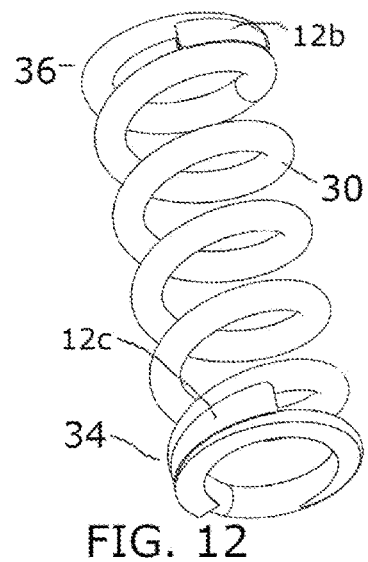
FIG. 12 is a lower perspective view of the coil spring with wedge inserts installed on each closed end portion of the coil spring.

Referring now FIG. 12, it is contemplated that the adjustment system 120 may include two wedge inserts coupled to the spring 30. For instance, wedge insert 12*b* may be installed adjacent closed end portion 36, while wedge insert 12*c* may be installed adjacent closed end portion 34. In this configuration, the 450 lb/in spring would have a spring rate of 500 lb/in (20+30). Thus, the adjustment system 120 is not limited to the use of a single wedge insert; rather both ends of the spring 30 may be engaged with respective wedge inserts to allow for greater adjustability of the effective spring rate.

Figure 13:
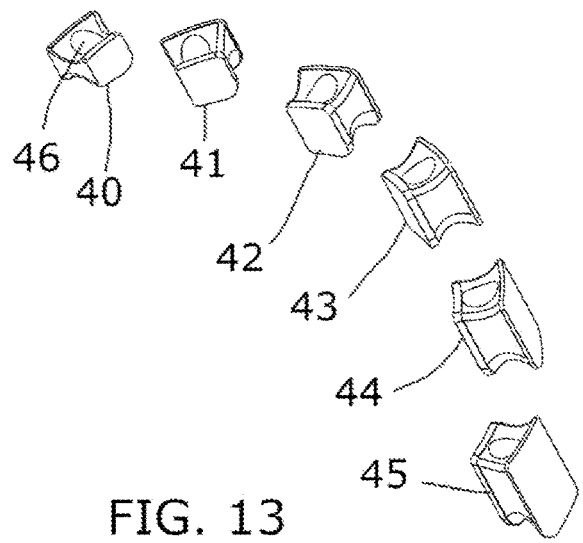
FIG. 13 is an upper perspective view a plurality of block inserts in a variety of sizes for use in an alternative embodiment of the adjustment system, each block insert being engageable with the coil spring to adjust an effective spring rate thereof.
Figure 14:
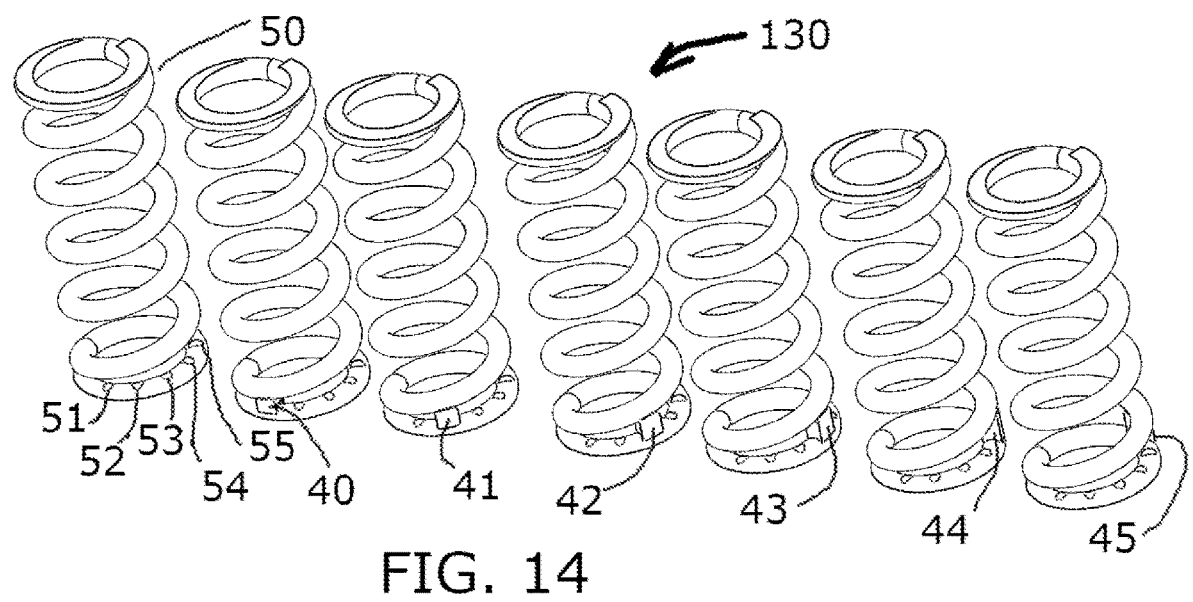
FIG. 14 is an upper perspective view of the various inserts blocks of FIG. 13 engaged with the coil spring for adjusting the adjustment system from weaker to stronger effective spring rates.
Figure 15:
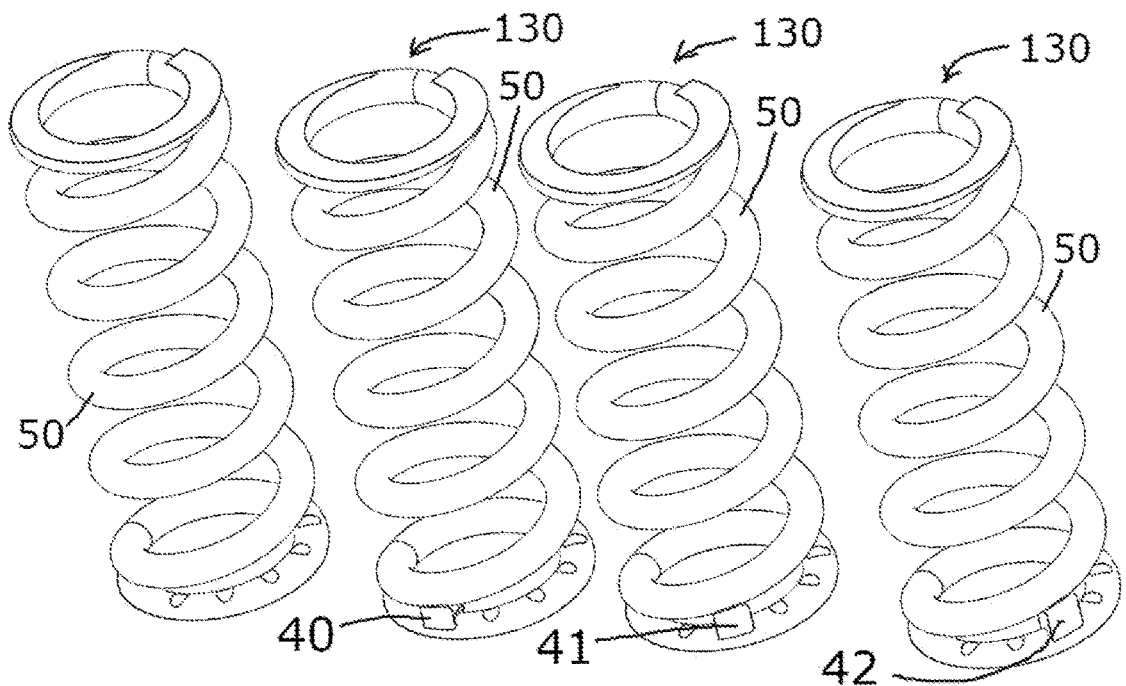
FIG. 15 is an enlarged view of some of the alternative adjustment systems depicted in FIG. 14.

FIGS. 13-15 show alternative embodiment of adjustment system 130 which includes spring 50 and block inserts 40-45, with each block insert 40-45 having a protrusion 46 formed thereon. The function of the block inserts 40-45 is similar to wedge inserts 12*a-f*, but in a more minimal size. Furthermore, spring 50 may include multiple grooves 51-56 (56 is hidden) to fit block inserts 40-45, respectively. The grooves 51-56 may be formed on at least one of the end coil or the adjacent coil, with the grooves 51-56 being spaced apart from each other. In one embodiment, the grooves 51-56 may be evenly spaced from each other, while in other embodiments, the grooves 51-56 may be separated by varying distances. The grooves 51-56 are sized and structured to receive the protrusion formed on one of the block inserts 40-45. For example, protrusion 46 on block insert 40 fits into groove 51 formed on spring 50.

Each block insert 40-45 is sized and structured to accommodate a respective portion of the gap formed between the end coil and the adjacent coil when the block inserts 40-45 are engaged with the spring 50. Block insert 40, being the smallest block insert, may occupy the narrowest portion of the gap, while block insert 41, being next in the size sequence of block inserts, may occupy the adjacent portion of the gap, and so on. Larger block inserts are associated with a larger increase in the effective spring rate than smaller blocks, as the larger block inserts reduce compression of a larger percentage of the adjacent coil, thereby deactivating a larger percentage of the adjacent coil. It is contemplated that the block inserts 40-45 may be individually engaged with the spring 50, and thus, a user may interchange the block inserts 40-45 by swapping out one block insert 40-45 and replacing it with another. However, in other embodiments, multiple block inserts 40-45 may be engaged with the spring 50 without departing from the spirit and scope of the present disclosure.

Figure 16:
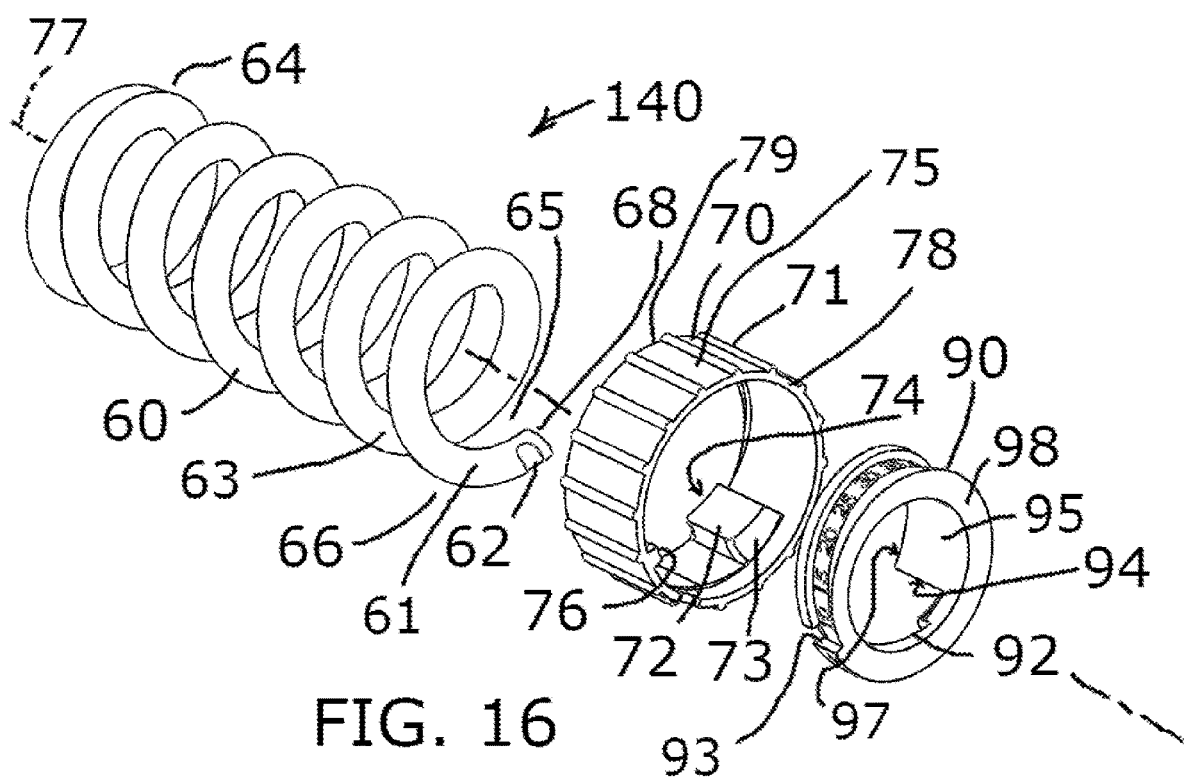
FIG. 16 is an upper perspective, exploded view of a second embodiment of the adjustment system including a coil spring, a rotatable collar, and a base.

Referring now to FIG. 16, there is depicted an exploded view of alternative embodiment of an adjustment system 140, which is specifically configured to allow for selectively incremental adjustment of the effective spring rate through rotation of a collar 70 relative to a spring 60. The adjustment system 140 defines a main axis 77, about which the spring 60 and collar 70 are disposed. Spring 60 includes a pair of end portions 64, 66, with end portion 64 being closed and ground, and end portion 66 being open and defining a gap 65. The coil positioned at the open end portion 66 is referred to as end coil 61, while the coil adjacent end coil 61 is referred to as adjacent coil 63. Open end portion 66 includes a groove 62 and an end surface 68.

Collar 70 includes a peripheral wall 75 disposed about the main axis 77, and block/body 72 extending radially inward from an inner surface of peripheral wall 75. The peripheral wall 75 includes a top surface 79 and a bottom surface 78. Similarly, the block 72 includes top and bottom surfaces 74 and 73, with the block 72 being sized to fit closely between adjacent coils of spring 60. Collar 70 may be structured to enhance a user's grip on the collar 70 for twisting or rotating the collar 70 relative to the spring 60. For instance, the collar 70 may include ribs 71 protruding outward from the peripheral wall 75. As shown in the exemplary embodiment, the ribs 71 may extend generally parallel to the main axis 77. The collar 70 may additionally include a stop 76, which may extend radially inward from the peripheral wall 75 at or adjacent the bottom surface 78.

The adjustment system 140 may further includes a base 90 disposed about the main axis 77 and engageable with the open end portion 66 of the spring 60. According to one embodiment, the base 90 includes a top surface 97 and a bottom surface 98. The bottom surface 98 may be generally planar, and extend generally perpendicularly to the main axis 77. The top surface 97 may be angled relative to the bottom surface 98, such that the distance between the top surface 97 and bottom surface 98 varies. A peripheral wall 95 may be disposed about the main axis 77 and extend between the top surface 97 and the bottom surface 98. Furthermore, the peripheral wall 95 terminates at one end to define an end surface 94. A bump or protrusion 92 may be formed on the top surface 97 adjacent the end surface 94. The base 90 additionally includes a pair of abutment shoulders 93, 99, extending generally parallel to the main axis 77 and circumferentially spaced from each other. The pair of abutment shoulders 93, 99 interface with the stop 76 on the collar 70 to define a rotational range of motion of the collar 70 relative to the base 90, as will be described in more detail below. The base 90 may additionally include indicator 104, which helps identify the added spring rate. The indicator 104 may include numbers or other indicia printed, etched or otherwise displayed on the peripheral surface 95 of the base 90.

When the adjustment system 140 is assembled, the base 90 resides within the collar 70, and the protrusion 92 on the base 90 is engaged with the groove 62 on the spring 60. When the base 90 is engaged with the spring 60, the base 90 may support and deactivate most of the first coil (e.g., end coil) of open end portion 66. In this regard, the top surface 97 of the base 90 may extend along the first coil as it extends helically from the end surface 68. As such, the angular configuration of the top surface 97 relative to the bottom surface 98 may be complimentary to the helical configuration of the spring 60.

Rotation of the collar 70 relative to spring 60 causes block 72 to be advanced through the gap 65 between the end coil 61 and the adjacent coil 63 so as to move along spring 60 like a threaded fastener. As collar 70 is rotated, the active coil closest to base 90 increasingly becomes inactive, increasing the spring rate. The spring rate remains linear. Collar 70 can deactivate about 75% of a coil in adjustment system 140, though depending on the design, collar 70 can deactivate up to one full coil and in infinitely small increments. With the selective, incremental rotational adjustment associated with adjustment system 140, the effective spring rate is so easy to adjust that a mountain biker, for example, could optimize their spring rate for specific trails. While increments of 5 pounds/inch are shown, collar 70 can be twisted between increments to any position between minimum and maximum.

The adjustment system 140 is configured such that the collar 70 is rotatable relative to the base 90 between a first position (e.g., a zero boost position), and a second position (e.g., a maximum boost position). In the first position, bottom surface 78 of collar 70 is coincident with bottom surface 98 of base 90. Stop 76 of collar 70 allows block 72 to rotate a prescribed amount along base 90. When the collar 70 is in the first position, the stop 76 is abutted against first abutment shoulder 93, and when the collar 70 is in the second position, the stop 76 is abutted against second abutment shoulder 99. In the example shown, collar 70 can rotate between positions correlated to zero-magnitude increase of effective spring rate and 55 lb/in increase of effective spring rate on a 450 lb/in spring.

Figure 17:
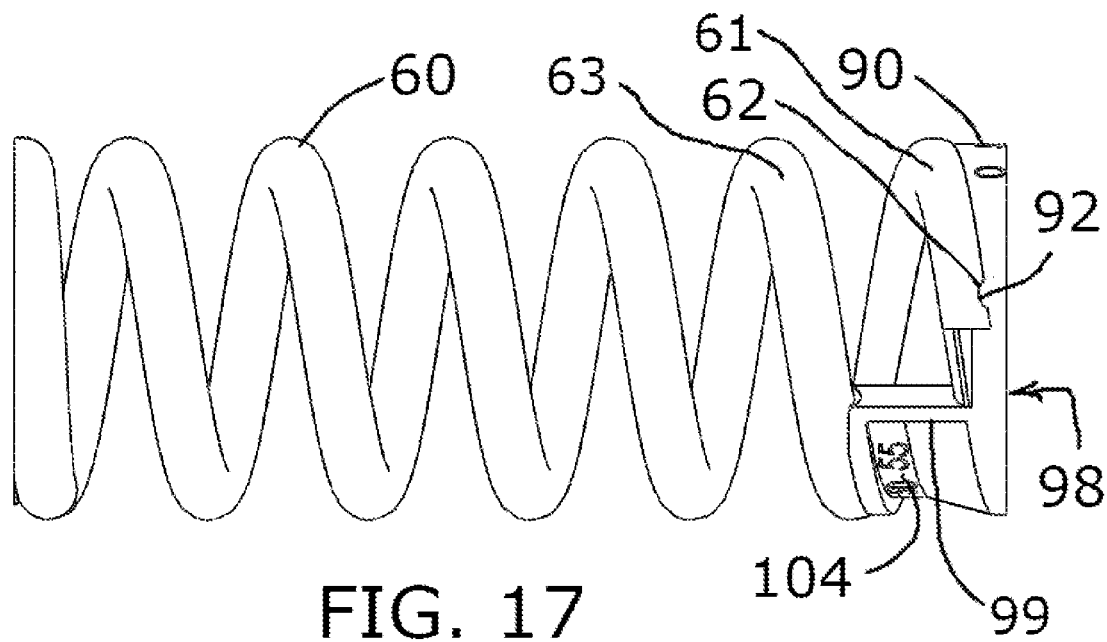
FIG. 17 is side view of the base and coil spring of FIG. 16, with the base installed at an end portion of the coil spring.

FIG. 17 shows a side view of adjustment system 140 with collar 70 hidden for purposes of more clearly depicting the engagement between the base 90 and the spring 60. As can be seen in FIG. 17, when base 90 is engaged with the spring 60, most of end coil 61 is supported and deactivated by base 90.

Figure 18:
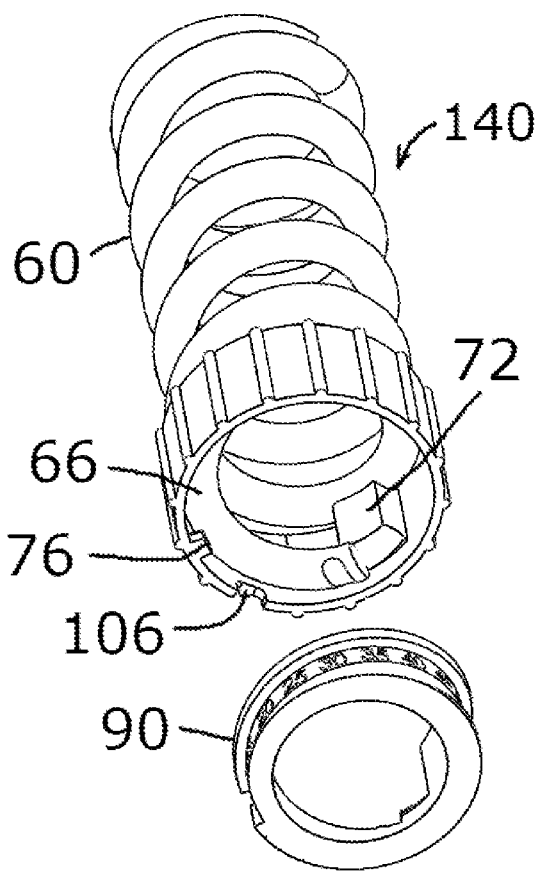
FIG. 18 is a partially exploded, lower perspective view of the adjustment system of FIG. 16 adjusted to its weakest effective spring rate setting.

FIG. 18 shows adjustment system 140 with base 90 exploded from the assembly, with the collar 70 being shown in the minimum strength setting, i.e., the first position. Block 72 of collar 70, in combination with base 90 (when the base 90 is engaged with the spring 60), is shown deactivating about one coil of spring 60 open end portion 66.

Figure 19:
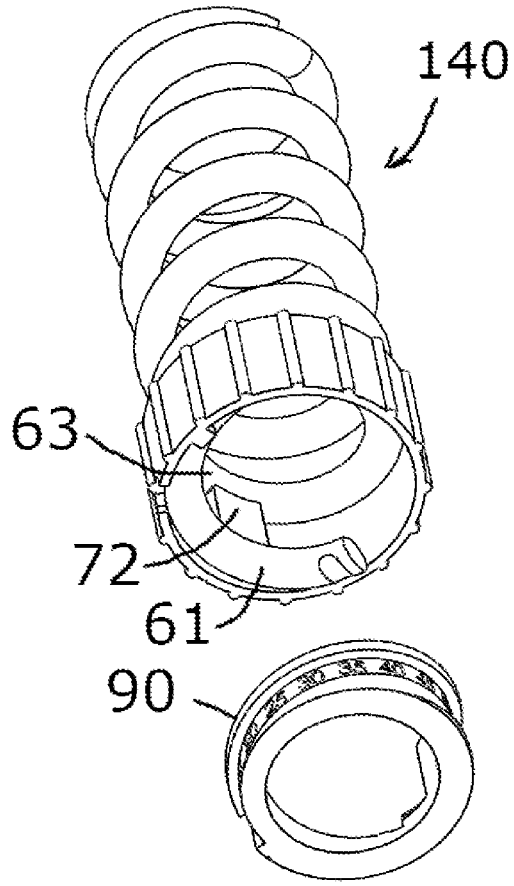
FIG. 19 is a partially exploded, lower perspective view of the second embodiment of the adjustment system, adjusted to a 15 lb/in stronger effective spring rate setting relative to the position depicted in FIG. 18.
Figure 20:
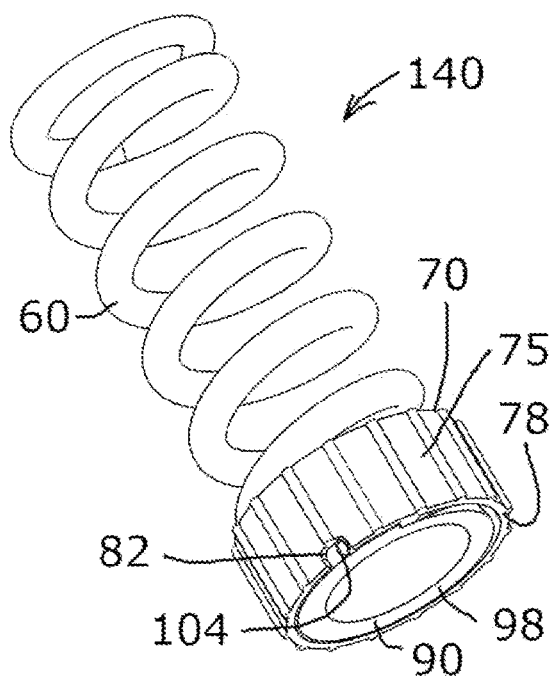
FIG. 20 is a lower perspective view the second embodiment of the adjustment system adjusted to its weakest effective spring rate setting.
Figure 21:
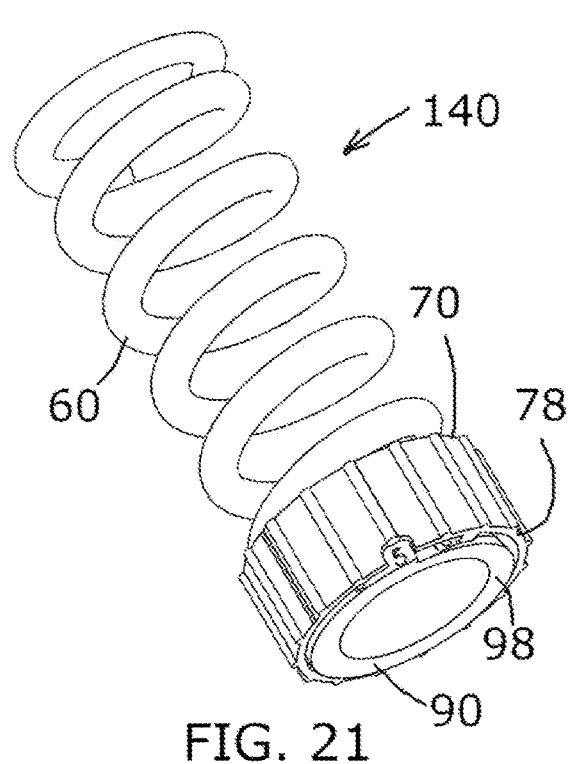
FIG. 21 is a lower perspective view of the second embodiment of the adjustment system adjusted to a 5 lb/in stronger effective spring rate setting relative to that shown in FIG. 20.
Figure 22:
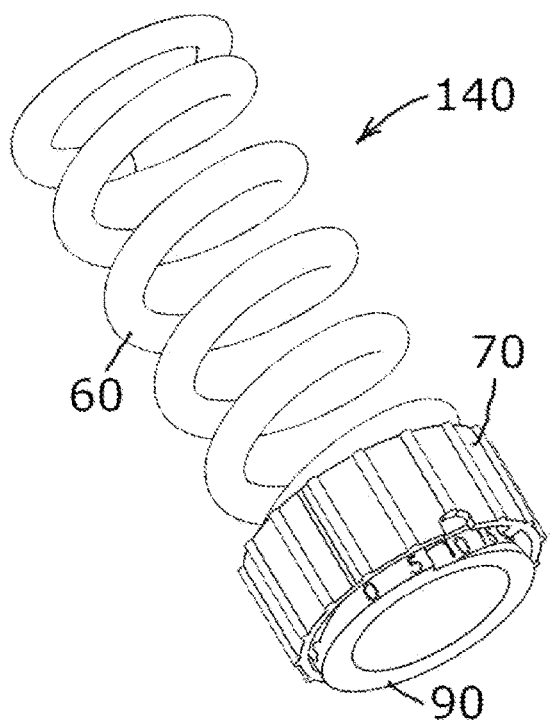
FIG. 22 is a lower perspective view of the second embodiment of the adjustment system adjusted to a 10 lb/in stronger effective spring rate setting relative to that shown in FIG. 20.
Figure 23:
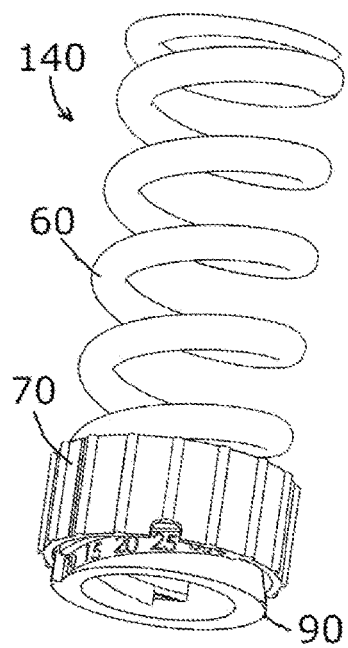
FIG. 23 is a lower perspective view of the second embodiment of the adjustment system adjusted to a 25 lb/in stronger effective spring rate setting relative to that shown in FIG. 20.
Figure 24:
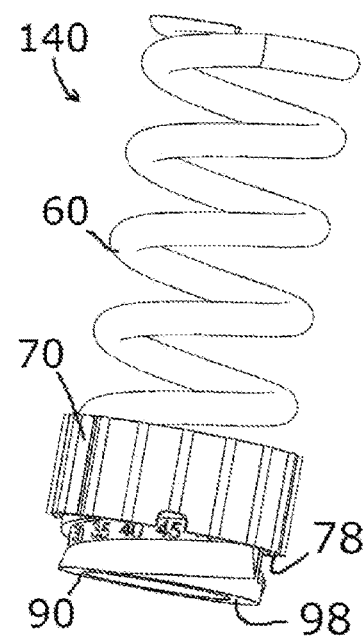
FIG. 24 is a lower perspective view of the second embodiment of the adjustment system adjusted to a 45 lb/in stronger effective spring rate setting relative to that shown in FIG. 20.
Figure 25:
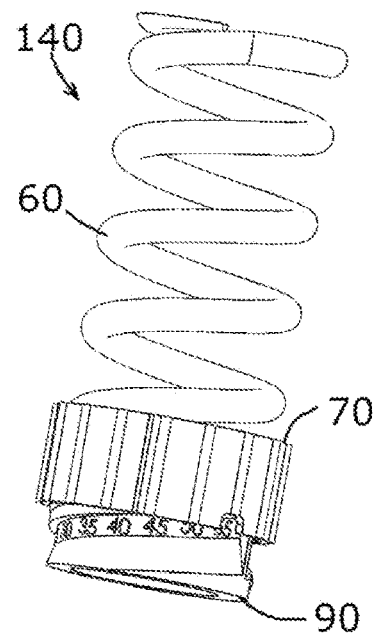
FIG. 25 is a lower perspective view of the second embodiment of the adjustment system adjusted to a 55 lb/in stronger effective spring rate setting relative to that shown in FIG. 20.

FIG. 19 shows adjustment system 140 with base 90 exploded from the assembly. Collar 70 is shown in the 15 pounds/inch added strength setting, e.g., between the first position and the second position. Block 72 is shown deactivating the end coil 61, and a portion of adjacent coil 63.

FIGS. 20-25 show adjustment system 140 in increasingly stiffer spring settings 0, 5, 10, 25, 45, and 55 lb/in. Opening 82 formed in peripheral wall 75 of collar 70 is aligned with the indicator 104 formed on the base 90, such that as the collar 70 is rotated relative to the base, the opening 82 exposes a portion of the indicator 104 associated with the added spring rate so that the user knows the effective spring rate associated with the current position of the collar 70. For example, in FIG. 21, it is easy to see that adjustment system 140 is adjusted to add 5 lb/in to the spring rate. Note that as collar 70 is rotated, bottom surface 78 of collar 70 moves away from surface 98 of base 90, because block 72 moves along spring 60 coil like a thread. In other words, the bottom surface 78 of collar 70 moves in a direction parallel to the main axis 77 as the collar 70 transitions between the first and second positions.

Figure 26:
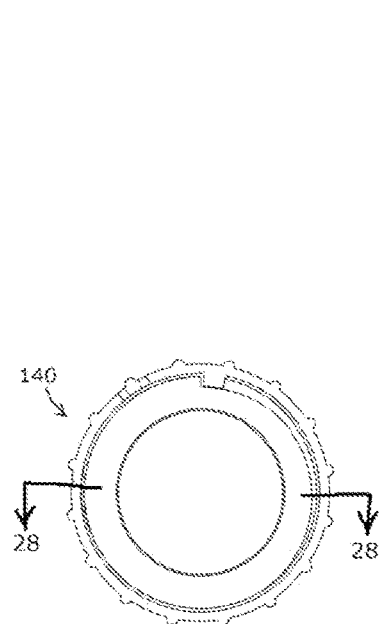
FIG. 26 is a bottom view of the second embodiment of the adjustment system adjusted to its weakest effective spring rate setting.
Figure 27:
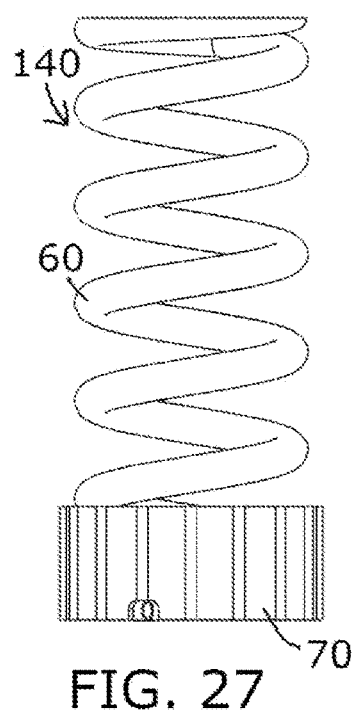
FIG. 27 is a side view of the second embodiment of the adjustment system adjusted to its weakest effective spring rate setting.
Figure 28:
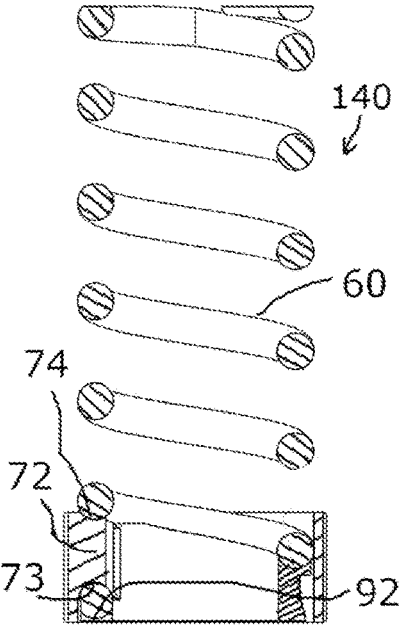
FIG. 28 is a section view of the second embodiment of the adjustment system adjusted to its weakest effective spring rate setting.

FIGS. 26-28 depicts the adjustment system 140 in its minimum strength position, e.g., the first position. In this position, for example, adjustment system 140 has its minimum spring rate of about 450 lb/in as shown. Open end portion 66 of spring 60 is supported by both top surface 97 of base 90 and top and bottom surfaces 74, 73 of collar 70.

FIGS. 29-31 depicts the adjustment system 140 in an intermediate position, e.g., between the first and second positions. In the exemplary embodiment, the adjustment system 140 in FIGS. 29-31 is adjusted to its 15 pounds/inch strength position. The spring rate of adjustment system 140 is about 465 lb/in or 15 lb/in higher. Block 72 of collar 70 has moved away from end surface 94 of base 90 and is deactivating more of the adjacent coil 63. Open end portion 66 of spring 60 is supported by both top surface 97 of the base 90 and top and bottom surfaces 74, 73 of collar 70.

FIGS. 32-34 depicts the adjustment system 140 in its maximum strength position, e.g., the second position. In the exemplary embodiment, the adjustment system 140 is adjusted to its maximum 55 lb/in added strength position. The spring rate of adjustment system 140 is about 505 lb/in or 55 pounds/inch higher than spring 110 alone. Block 72 of collar 70 has moved farther away from base surface 94 and is deactivating more of spring 60 coil. Specifically, open end portion 66 of spring 60 is supported by both top surface 97 of base 90 and top and bottom surfaces 74, 73 of collar 70.

Referring now to FIGS. 35 and 36 there is shown another embodiment of adjustment system 150 generally including spring 110 and an insert 160. The insert 160 includes a flange 162, hook 164, and wedge 166. Insert 160 locks onto spring 110 without spring 110 needing to have a groove. Flange 162 flexes open to allow wedge 166 to be inserted into spring 110 near a closed end portion 112 of the spring 110 and when positioned correctly, hook 164 of insert 160 locks behind surface 114 of spring 110.

Referring now to FIG. 37, there is depicted an adjustable rear shock comprised of spring 30 installed on prior art damper 190. Because no wedge is installed on the spring 30, the spring rate is at its lowest level which is the base spring rate. There is a protrusion 32 for helping to retain a wedge when installed.

Figure 38:
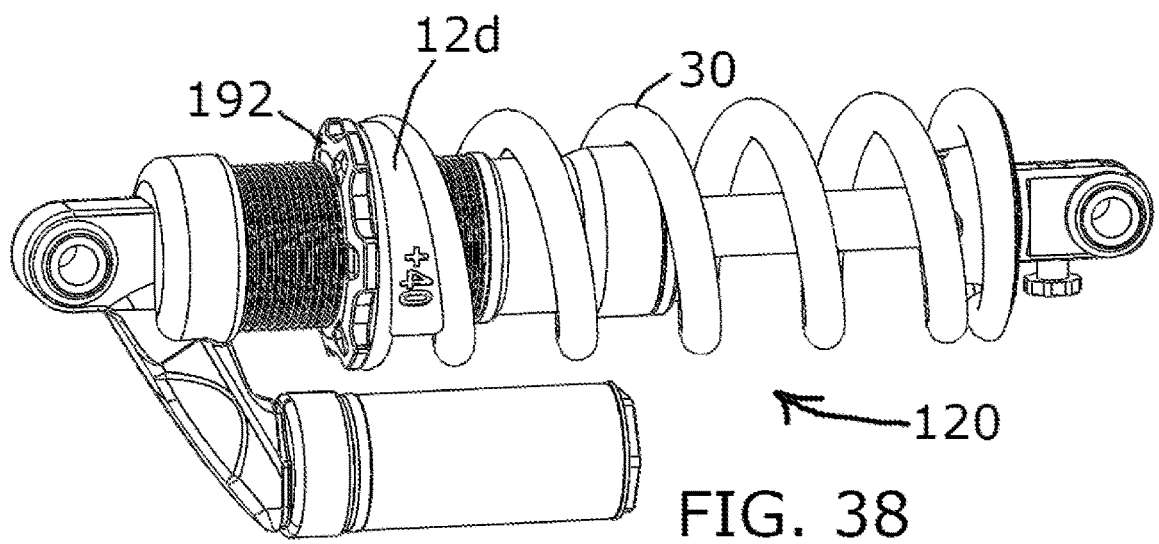
FIG. 38 is an upper perspective view of the shock with the first embodiment of the adjustment system installed in a medium spring rate condition.

FIG. 38 shows adjustment system 120 with wedge 12 installed on spring 30 so that the spring rate has increased by 40 lb/in compared to without the wedge. In this example, the desired spring rate between 10 and 60 lb/in increase can be achieved depending on the size of the wedge that is used.

Figure 39:
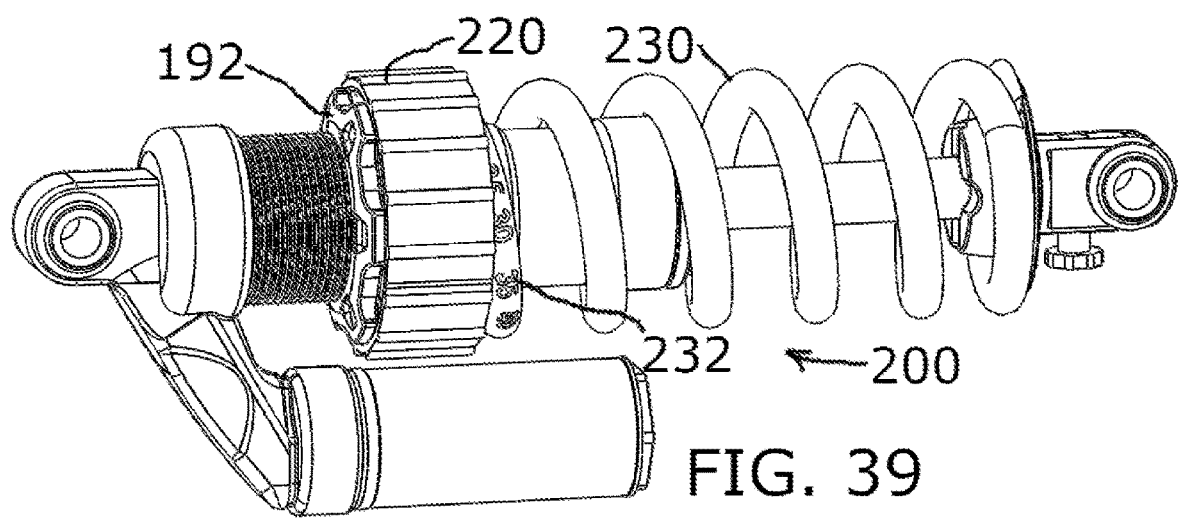
FIG. 39 is an upper perspective view of the shock with the second embodiment of the adjustment system installed and in the lowest spring rate condition.
Figure 40:
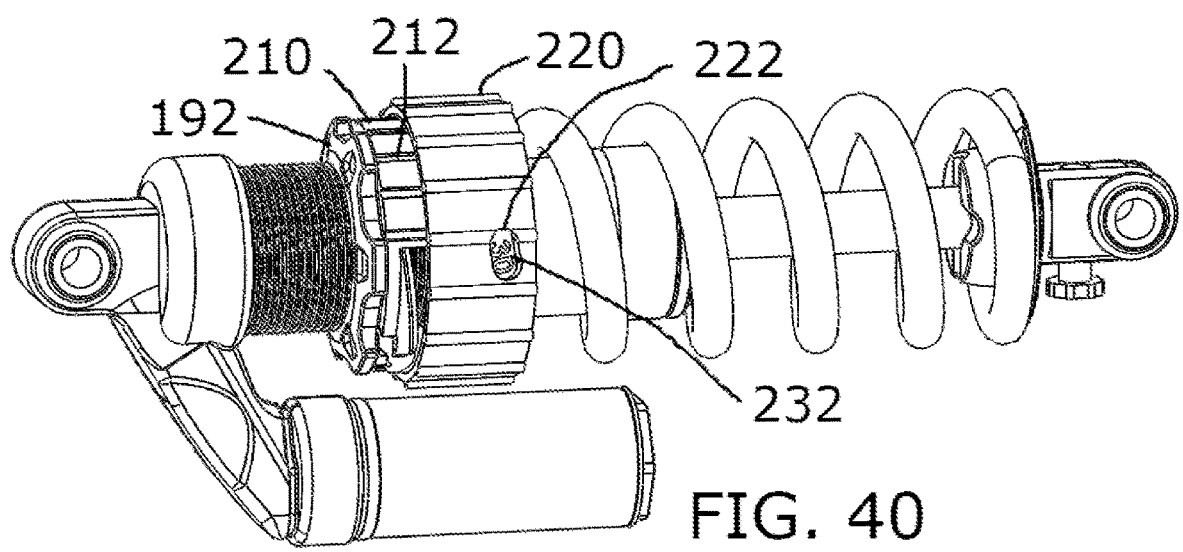
FIG. 40 is an upper perspective view of the shock with the second embodiment of the adjustment system installed and in a medium spring rate condition.

FIG. 39 shows an adjustable rear shock comprised of adjustment system 200 installed on prior art damper 190 and adjusted in the minimum spring rate position. Adjustment system 200 is similar to adjustment system 140 except for two primary differences. The first difference is that adjustment system 200 includes a different indicator system than adjustment system 140. In particular, adjustment system 140 includes an opening 82 on collar 70 that exposes indicator 104 on base 90 so that the user knows the spring strength setting, whereas adjustment system 200 includes an opening 222 on collar 220 and indicator markings 232 on spring 230. Indicator markings 232 can be easily pad printed, for example, on spring 230. The second difference is that collar 90 of adjustment system 140 turns smoothly, whereas collar 220 of adjustment system 200 "clicks" when turned in order to provide touch and auditory position feedback. That way, when adjusting the spring rate, the user can choose to simply count the "clicks" instead of visually looking at indicator markings 232 within opening 222. To achieve this "clicking", there are grooves 212 in base 210 and a rib 224 (not shown) on the inner diameter of collar 220 that engage with grooves 212. Collar 220 flexes enough to cause "clicking" as rib 224 passes in and out of grooves 212. It is noted that even though there are indicator markings 232 that show 5 lb/in spring rate increase, the user can choose to turn the dial to any position between the markings in order to achieve any specific spring rate desired within the possible range. FIG. 40 shows an adjustable rear shock with adjustment system 200 adjusted in a setting that increases the spring rate by 30 lb/in. This was simply achieved by twisting collar 220 and did not change the overall spring assembly length and did not change the preload so that preload ring 192 does not need to be readjusted. If necessary, the user can hold spring 230 in one hand while turning collar 220 with the other. Alternatively, base 210 could have an internal thread and then preload ring 192 of damper 190 could be eliminated.

Figure 41:
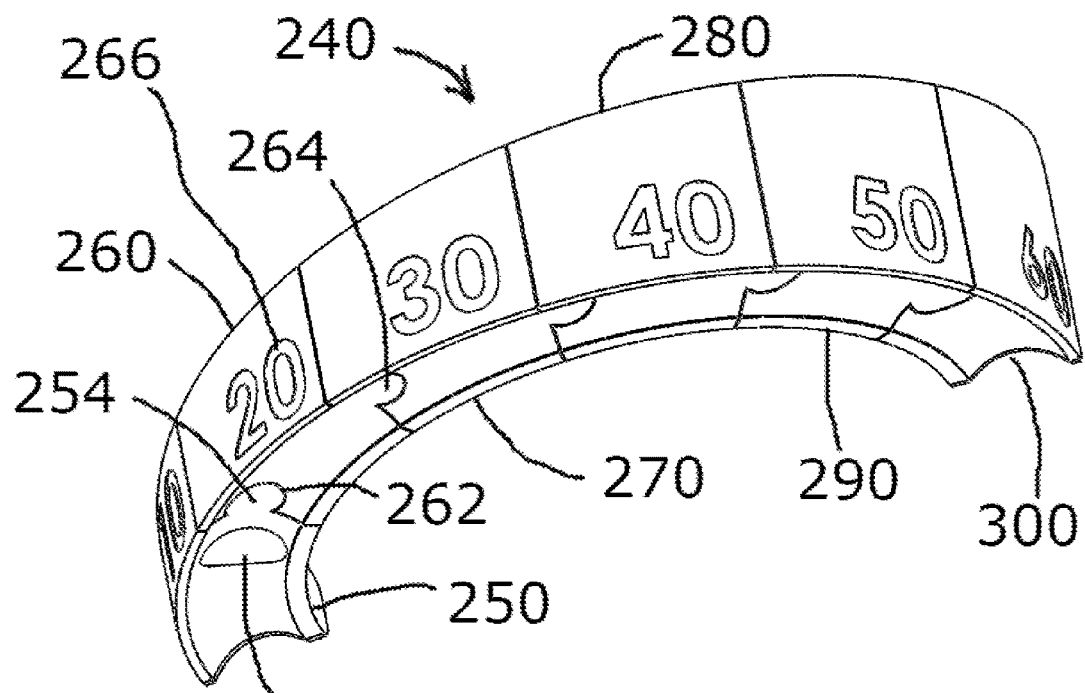
FIG. 41 is a lower perspective view of another embodiment of a selectively sizable wedge insert for an adjustment system.
Figure 42:
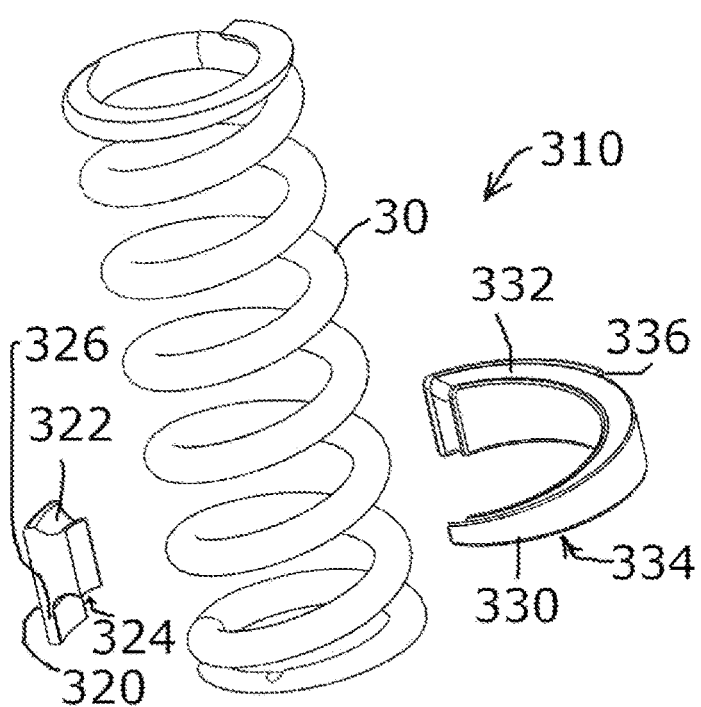
FIG. 42 is an upper perspective exploded view of another embodiment of the adjustment system.

FIG. 41 shows another embodiment of an adjustment system 240 (spring 30 not shown), which is similar to adjustment system 120 except instead of each wedge being an independent component, wedges 250, 260, 270, 280, 290, and 300 fit together. For example, wedge 250 has a protrusion 252 and a tongue 254. To add 10 lb/in to the spring rate, only wedge 250 would be added to spring 30. To add 20 lb/in to the spring rate, then wedge 260 would be assembled to wedge 250 by fitting groove 262 over tongue 254 and then the pair installed into spring 30. In this way, wedges 270, 280, 290, and 300 can be added for more spring rate increase. Indicators 266 identify the amount of spring rate added.

There are other embodiments that anyone skilled in the art would readily recognize. For example, while a protrusion on the wedge in adjustment systems 120, 130, and 240 engages with a groove on the spring, there are many other ways to keep the wedge firmly in position without the possibility of moving out of position. For example, there could be a protrusion on the spring and a groove in the wedge. Also, while the wedges in adjustment systems 120, 130, and 240 are preferably made of a relatively rigid material such as glass filled nylon, it would be possible to use a high durometer elastomer, although this would cause the spring rate to be non-linear. Also, while adjustment systems 140 and 200 show the adjustment system on one end portion of the spring, there could be an adjustment system on both end portions of the spring in order to allow a larger increase in spring rate.

Figure 43:
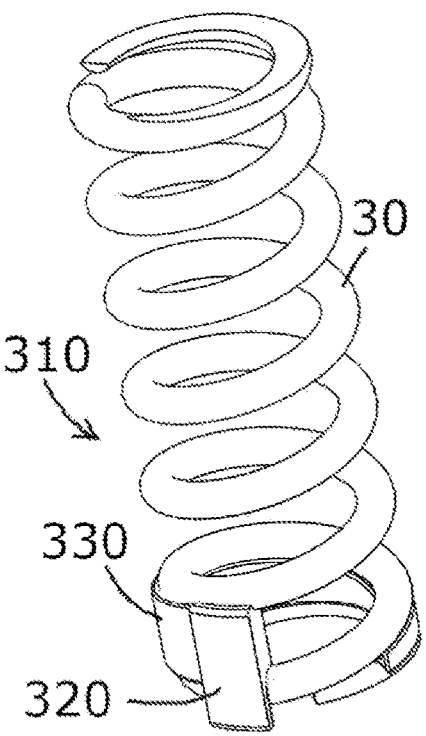
FIG. 43 is an upper perspective view of the adjustment system of FIG. 42 adjusted to a lowest spring rate condition.
Figure 44:
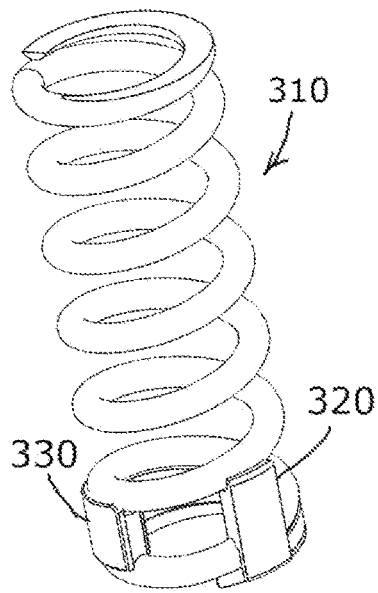
FIG. 44 is an upper perspective view of the adjustment system of FIG. 42 adjusted to a medium spring rate condition.
Figure 45:
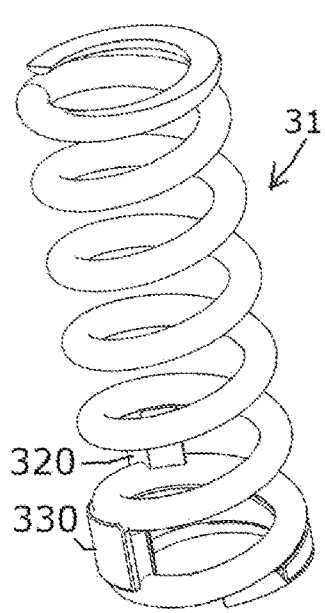
FIG. 45 is an upper perspective view of the adjustment system of FIG. 42 adjusted to the highest spring rate condition.

FIGS. 42-45 show another embodiment of an adjustment system 310 that has rotational spring rate adjustment and is comprised of spring 30, an body 320, and an wedge insert 330. Rotationally adjusted adjustment system 310 works with a spring 30 that is closed on both ends, with the spring 30 defining a base spring rate. Wedge insert 330 is inserted into position similarly to descriptions of previous embodiments. As shown in FIGS. 43-45, when the wedge insert 330 is engaged with the spring 30, the wedge insert 330 extends in an axial direction between a first coil and a second coil, and in a rotational direction by about 270 degrees. When the wedge insert 330 is inserted into the spring 30, the spring rate of the system 310 is increased by virtue of the wedge insert 330 mitigating compression of the first and second coils in that 270 degree zone occupied by the wedge insert 330. The increased spring rate associated solely with insertion of the wedge insert 330 into the spring 30 may be referred to as a first effective spring rate.

In addition to the wedge insert 330 being engaged with the spring 30, body 320 is also engaged with the spring 30 so as to further increase the spring rate of the adjustment system 310 beyond the first effective spring rate. In this regard, body 320 is snapped into position, with helical surfaces 322 and 324 contacting adjacent coils of the spring 30. When the body 320 is snapped into position, body 320 can be slid along the spring 30 to any desired position within a range to achieve a desired second effective spring rate greater than the first effective spring rate. In this respect, the body 320 may be transitioned between a first position associated with a lowest second effective spring rate, and a second position associated with a highest second effective spring rate. In the first position, shown in FIG. 43, the body 320 contacts a terminal end surface of the wedge insert 330, with the body 320 effectively functioning as an extension of the wedge insert 330, such that the wedge insert 330 and body 320 occupy more than 270 degrees of the gap between the first and second coils of the spring. As the body 320 moves from the first position toward the second position, the body 320 may move helically along the spring 30, away from the terminal edge surface of the wedge insert 330. As used herein, helical movement may refer to movement having both an axial component and a radial component, such that movement in a radial direction also results in movement in an axial direction. When the body 320 is in the positions shown in FIGS. 44 and 45, the body 320 is extending axially between the second coil and the third coil. As the body 320 moves from the first position toward the second position, the body 320 is effectively deactivating more of the coils of the spring 30, which has the effect of increasing the second effective spring rate of the adjustment system 310. In other words, the body 320 and the wedge insert 330 may not only prevent compression of the portions of the spring 330 with which they are in direct contact, the body 320 and the wedge insert 330 may also prevent compression of the helical portion of the spring 330 extending between the body 320 and the wedge insert 330. Thus, by moving the body 320 helically away from the wedge insert 330 a greater percentage of the spring 30 becomes effectively incompressible, which in turn, increases the effective spring rate.

When the body 320 reaches the second position, movement of body 320 is limited by abutment of side surface 326 on body 320 with stop 336 formed on wedge insert 330. According to one embodiment, adjustment system 310 may have a rotational range of about 270 degrees of rotation, but if stop 336 was relocated, adjustment system 310 could increase spring rate through an entire 360 degrees of rotation. A clicking engagement could be created between, for example, body 320 and wedge insert 330 or between body 320 and spring 30. It is also contemplated that gauge markings could also be added.

Figure 46:
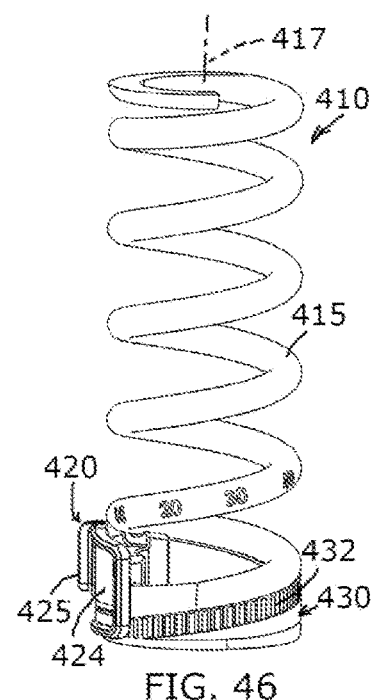
FIG. 46 is a front view of another embodiment of the adjustment system including a spring, a wedge insert, and a body moveably engageable with the wedge insert, the body being in a first position.
Figure 47:
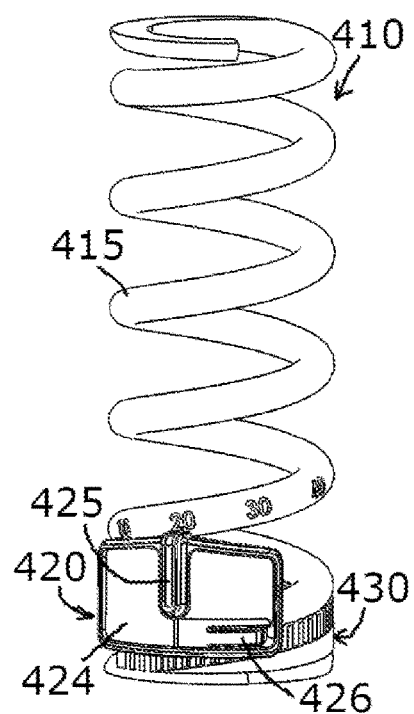
FIG. 47 is a front view of the adjustment system of FIG. 46, the body being moved to a second position relative to the first position shown in FIG. 46.
Figure 48:
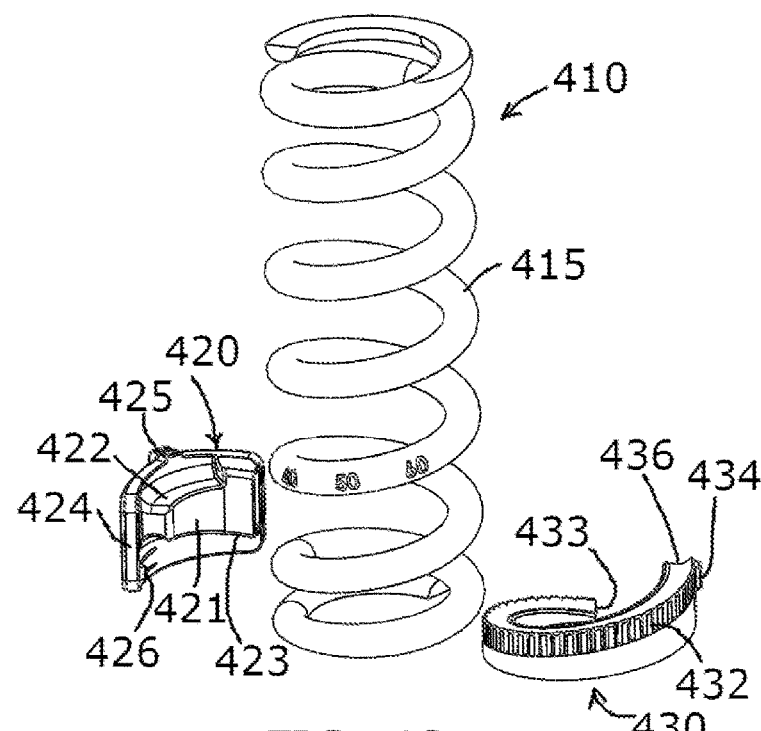
FIG. 48 is an upper perspective, exploded view of the adjustment system of FIG. 46.

Referring now to FIGS. 46-48, another embodiment of an adjustment system 410 is shown. Adjustment system 410 is similar to the adjustment system 310 shown in FIGS. 42-45, with adjustment system 410 including a spring 415, wedge insert 430, and a body 420 moveable relative to the wedge insert 430, with the spring 415 defining a spring axis 417, wedge insert 430 is insertable into the spring 415 to contact adjacent coils and mitigate compression of those coils, thereby providing a first effective spring rate greater than a base spring rate defined solely by the spring 415.

Body 420 is also engageable with the spring 410 for providing a second effective spring rate greater than the first effective spring rate. The magnitude of the second effective spring rate may be incrementally adjusted through movement of the body 420 relative to the spring 415 and wedge insert 430. The body 420 includes an insert 421 having an upper surface 422 and a lower surface 423, which contact respective, adjacent coils on the spring 410. In this respect, the insert 421 is sized to extend within, and occupy, the gap formed between adjacent coils on the spring 410. The body 420 further includes an arcuate wall 424, which is coupled to the insert 421 may be positioned outside of the spring 410 (e.g., beyond the outer diameter of the spring 410) when the body 420 is engaged with the spring 420. The body 210 may further include an indicator 425, which in the exemplary embodiment, includes a spine or ridge protruding outwardly from the arcuate wall 424, and extending in a direction generally parallel to the spring axis 417. The indicator 425 may provide the user with an indication of the magnitude of added spring rate associated with the position of the body 420 relative to the spring 410. In this regard, the spring 415 may include indicia imprinted, etched, or otherwise formed on the spring 415, with such indicia cooperating with the indicator 425 to provide an indication of the added spring rate magnitude. For instance, in FIG. 47, the indicator 425 is aligned with "20" on the spring 415 to provide notice to the user that when the body 420 is in the position shown in FIG. 47, the adjustment system 410 adds 20 lb/in to the base spring rate.

The body 420 and the wedge insert 430 may include complimentary engagement elements to allow for incremental adjustment of the body 420 relative to the wedge insert 430. In the exemplary embodiment, the wedge insert 430 includes a plurality of grooves 432 formed on an outer surface of the wedge insert 430, with each groove 432 extending in a direction generally parallel to the spring axis 417 when the wedge insert 430 is engaged with the spring 415. The body 420 includes a tab 426 which is moveably coupled to the arcuate wall 424. The tab 426 may bend or flex relative to the arcuate wall 424 to allow the tab 424 to move in an out of engagement with the grooves 432 as the body 420 is moved relative to the wedge insert 430. In particular, the tab 426 may be moved between a first position associated with the tab 426 residing within one of the grooves 432, and a second position associated with the tab 426 being removed from the grooves 432. In this respect, the tab 426 moves in a radially inward direction as the tab 426 transitions between the second position and the first position. In one embodiment, the tab 426 may be biased toward the first position. The operative engagement between the tab 426 and the plurality of grooves 432 may produce a clicking sound resulting from the tab 426 moving in and out of engagement with the grooves 432.

The body 420 may be transitioned relative to the wedge insert 430 between a first position associated with a lowest second effective spring rate, and a second position associated with a highest second effective spring rate. In the first position, the tab 426 resides within the groove 432 formed adjacent a narrow end 433 of the wedge insert 430. As the body 420 moves from the first position toward the second position, the body 420 may move helically along the spring 415, to effectively deactivate more of the coils of the spring 415, which has the effect of increasing the second effective spring rate of the adjustment system 410, as described in more detail above. When the body 420 reaches the second position, movement of body 420 may be limited by abutment of the tab 426 with a stop 434 formed on wedge insert 430 adjacent a wide end 436.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An adjustment system for use with a damper of a bike suspension, the adjustment system comprising:
   a coil spring engageable with the damper and extending about a spring axis, the coil spring having:
      an end coil;
      an adjacent coil extending helically away from the end coil to define a gap between the end coil and the adjacent coil in a direction parallel to the spring axis; and
      a first engagement element formed on at least one of the end coil and the adjacent coil; and
   an insert having a second engagement element engageable with the first engagement element, the insert occupying a portion of the gap and contacting the end coil and the adjacent coil to mitigate compression of the adjacent coil toward the end coil when the second engagement element is engaged with the first engagement element.

2. The adjustment system recited in claim 1, wherein the first engagement element includes a groove formed on the at least one of the end coil and the adjacent coil.

3. The adjustment system recited in claim 2, wherein the second engagement element includes a protrusion complimentary to the groove.

4. The adjustment system recited in claim 1, wherein the size of the gap increases as the adjacent coil extend portions away from the end coil.

5. The adjustment system recited in claim 1, wherein the insert includes a first surface and a second surface, the first surface contacting the end coil and the second surface contacting the adjacent coil when the first engagement element is engaged with the second engagement element.

6. The adjustment system recited in claim 5, wherein the insert includes a first end portion and a second end portion, both the first surface and the second surface extending between the first and second end portions, a distance between the first and second surfaces varying between the first end portion and the second end portion.

7. The adjustment system recited in claim 1, wherein the insert is a first insert, the adjustment system further comprising a second insert larger than the first insert, the first insert and the second insert being interchangeably engageable with the coil spring, the second insert being sized to occupy a larger portion of the gap than the first insert when the second insert is engaged with the coil spring.

8. The adjustment system recited in claim 1, wherein the insert is a first insert, the adjustment system further comprising a second insert engageable with the first insert, the first insert and second insert being engageable with the coil spring when the first insert is engaged with the second insert.

9. The adjustment system recited in claim 8, wherein the first insert includes a tongue and the second insert includes a groove sized to receive the tongue of the first insert to facilitate engagement between the first insert and the second insert.

10. The adjustment system recited in claim 1, wherein the coil spring includes a second engagement element engageable with a second insert.

11. An adjustment system for use with a damper of a bike suspension, the adjustment system comprising:
    a coil spring engageable with the damper, the coil spring having a first end portion and a helical body including a plurality of coils, the coil spring being associated with a base spring rate;
    a base engageable with the first end portion of the coil spring; and
    a collar rotatable relative to the coil spring, the collar having a peripheral wall, and a body extending from the peripheral wall and contacting an adjacent pair of the plurality of coils to mitigate compression of the adjacent pair of the plurality of coils to define an effective spring rate equal to or greater than the base spring rate, the body being moveable along the helical body as the collar is rotated relative to the coil spring, the effective spring rate being adjustable by movement of the body relative to the plurality of coils;
    the collar being rotatable relative to the base and transitional between a first position and a second position, the collar having an abutment portion contacting the base when the collar is in the first position, the abutment portion of the collar moving out of contact with the base as the collar is transitioned from the first position toward the second position.

12. The adjustment system recited in claim 11, wherein the base includes an indicator displaying effective spring rate information based on a relative rotational position of the collar relative to the base.

13. The adjustment system recited in claim 11, wherein the effective spring rate of the coil spring increases as the collar is rotated from the first position toward the second position.

14. The adjustment system recited in claim 13, wherein the effective spring rate is equal to the base spring rate when the collar is in the first position.

15. The adjustment system recited in claim 11, wherein the base includes a first surface and a second surface spaced from the first surface, the second surface being complimentary in shape to a portion of the helical body so as to extend portion along the portion of the helical body when the base is engaged with the coil spring.

16. An adjustment system for use with a damper of a bike suspension, the adjustment system comprising:
a coil spring engageable with the damper, the coil spring having helical body including a plurality of coils, the coil spring being associated with a base spring rate;
a wedge insert engageable with the coil spring; and
a body engageable with the coil spring and moveable relative to the coil spring and the wedge insert, the body contacting adjacent coils on the coil spring to mitigate compression of the coils to generate an effective spring rate of the coil spring greater than the base spring rate, the body being moveable relative to the coil spring between a first position and a second position, the effective spring rate increasing as the body moves from the first position toward the second position;
wherein the body and the wedge insert include complementary engagement elements to facilitate selective incremental adjustment of the body relative to the wedge insert.

17. The adjustment system recited in claim 16, the wedge insert extending between a first pair of coils on the coil spring to mitigate compression between the first pair of coils, the body extending between a second pair of coils on the coil spring to mitigate compression between the second pair of coils.

18. The adjustment system recited in claim 17, the body moving helically away from the first pair of coils as the body transitions from the first position toward the second position.

19. The adjustment system recited in claim 16, wherein the complimentary engagement elements include a plurality of grooves formed on one of the body and the wedge insert, and a tab on the other one of the body and the wedge insert.

20. The adjustment system recited in claim 19, wherein the tab is on the body, the body further comprising a wall, the tab being moveable relative to the wall between a first position associated with the tab residing within one of the plurality of grooves, and a second position associated with the tab being removed from the plurality of grooves.

21. An adjustment system for use with a damper of a bike suspension, the adjustment system comprising:
a coil spring engageable with the damper, the coil spring having helical body including a plurality of coils, the coil spring being associated with a base spring rate; and
a collar rotatable relative to the coil spring, the collar having a peripheral wall, and a body extending from the peripheral wall and contacting an adjacent pair of the plurality of coils to mitigate compression of the adjacent pair of the plurality of coils to define an effective spring rate equal to or greater than the base spring rate, the body being moveable along the helical body as the collar is rotated relative to the coil spring, the effective spring rate being adjustable by movement of the body relative to the plurality of coils;
the peripheral wall being sized to completely circumnavigate the coil spring when the collar is engaged with the coil spring.

22. An adjustment system for use with a damper of a bike suspension, the adjustment system comprising:
a coil spring engageable with the damper, the coil spring having a first end portion and helical body including a plurality of coils, the coil spring being associated with a base spring rate;
a base extending around a main axis, the base having a first surface generally perpendicular to the main axis and a second surface angled relative to the first surface and contacting the coil spring when the base is engaged with the coil spring; and
a collar rotatable relative to the coil spring, the collar having a peripheral wall, and a body extending from the peripheral wall and contacting an adjacent pair of the plurality of coils to mitigate compression of the adjacent pair of the plurality of coils to define an effective spring rate equal to or greater than the base spring rate, the body being moveable along the helical body as the collar is rotated relative to the coil spring, the effective spring rate being adjustable by movement of the body relative to the plurality of coils;
the collar having a first surface and a second surface, both the first and second surfaces being generally perpendicular to the main axis, the collar being rotatable relative to the base and transitional between a first position and a second position, the collar moving in a direction parallel to the main axis as the collar transitions between the first and second position.

23. The adjustment system recited in claim 22, wherein the first surface of the collar is generally coincident with the first surface of the base when the collar is in the first position, the first surface of the collar being axially spaced from the first surface of the base when the collar assumes the second position.

* * * * *